(12) United States Patent
Matsuba et al.

(10) Patent No.: US 8,634,474 B2
(45) Date of Patent: Jan. 21, 2014

(54) CABAC MACROBLOCK REWIND AND END OF SLICE CREATION TO CONTROL SLICE SIZE FOR VIDEO ENCODERS

(75) Inventors: Yasutomo Matsuba, Allen, TX (US); Akira Osamoto, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 74 days.

(21) Appl. No.: 13/099,581

(22) Filed: May 3, 2011

(65) Prior Publication Data
US 2012/0281768 A1 Nov. 8, 2012

(51) Int. Cl.
*H04N 7/12* (2006.01)
*H04N 11/02* (2006.01)
*H04N 11/04* (2006.01)

(52) U.S. Cl.
USPC .................................. 375/240.24

(58) Field of Classification Search
USPC ....................... 375/240.01–240.27
See application file for complete search history.

(56) References Cited

U.S. PATENT DOCUMENTS

| | | | |
|---|---|---|---|
| 2008/0170627 A1* | 7/2008 | Yamada et al. | 375/240.24 |
| 2008/0267293 A1* | 10/2008 | Swami et al. | 375/240.16 |
| 2009/0310684 A1* | 12/2009 | Mizutani | 375/240.24 |
| 2010/0329351 A1* | 12/2010 | Yagasaki et al. | 375/240.18 |

* cited by examiner

*Primary Examiner* — Andy Rao
*Assistant Examiner* — Jared Walker
(74) *Attorney, Agent, or Firm* — Robert D. Marshall, Jr.; W. James Brady; Frederick J. Telecky, Jr.

(57) ABSTRACT

This invention is computer implemented method of encoding video data into a compressed form. Encoding each macroblock in a frame of video data stores Context based Adaptive Binary Arithmetic Coding (CABAC) data in first and second CABAC engine registers. Each macroblock is classified into either a first type having recoverable CABAC engine registers or a second type having non-recoverable CABAC engine registers. The method closes a slice of data if the current macroblock exceeds a slice data size limit. The method restores or re-encodes previous macroblock CABAC engine registers dependent upon the states of the previous macroblock and the macroblock before that.

4 Claims, 12 Drawing Sheets

(1) L1I CACHE MISS FILL FROM L2
(2) L1D CACHE MISS FILL FROM L2
(3) L1D WRITE MISS TO L2, OR L1D VICTIM TO L2, OR L1D SNOOP RESPONSE TO L2
(4) L2 CACHE MISS FILL, OR DMA INTO L2
(5) L2 VICTIM WRITE BACK, OR DMA OUT OF L2
(6) DMA INTO L2
(7) DMA OUT OF L2

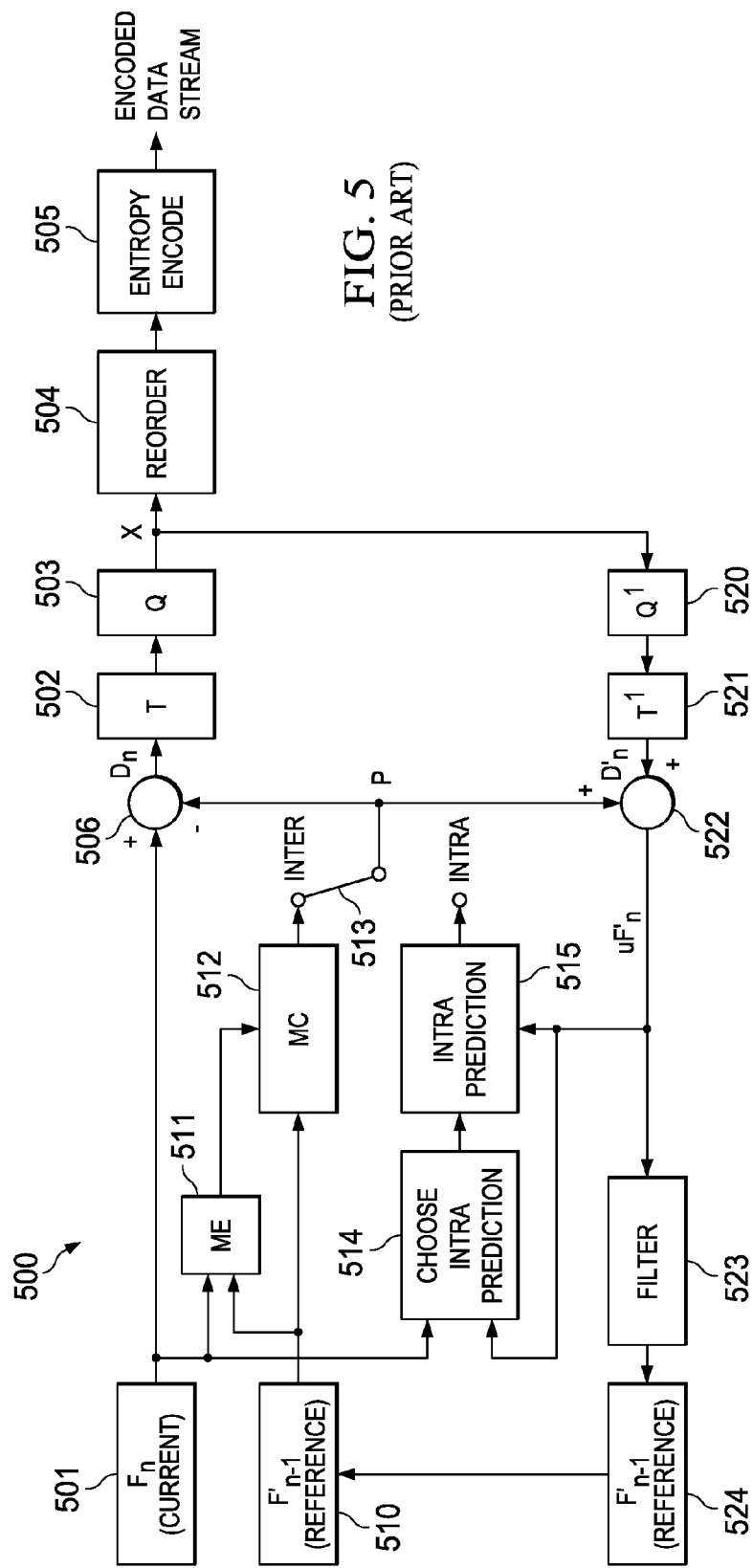

CABAC MACROBLOCK REWIND AND END OF SLICE CREATION TO CONTROL SLICE SIZE FOR VIDEO ENCODERS

TECHNICAL FIELD OF THE INVENTION

The technical field of this invention is encoding in image transmission systems such as video conferencing and video compression especially Context based Adaptive Binary Arithmetic Coding (CABAC) that employ H.241 compliant maximum NAL-units bitstreams with minimum loss of video encoder performance.

BACKGROUND OF THE INVENTION

New video conferencing encoding standards such as H.264 employ Context based Adaptive Binary Arithmetic Decoding (CABAC). In CABAC data is encoded based upon the relationship between the most probable next data and other data. The most probable data is encoded in fewer bits than other data. Many types of image data can be transmitted in this form. This application discloses an example of encoding of a significance map, but other data types are feasible.

Image data compression often employs a spatial to frequency transform of blocks of image data known as macroblocks. A Discrete Cosine Transform (DCT) is typically used for this spatial to frequency transform. Most images have more information in the low frequency bands than in the high frequency bands. It is typical to arrange and encode such data in frequency order from low frequency to high frequency. Generally such an arrangement of data will produce a highest frequency with significant data that is lower than the highest possible encoded frequency. This permits the data for frequencies higher than the highest frequency with significant data to be coded via an end-of-block code. Such an end-of-block code implies all remaining higher frequency data is insignificant. This technique saves coding the bits that might have been devoted to the higher frequency data.

The H.264 video conferencing standard uses significance map to perform run-level information encoding after quantization. Every coefficient that is non-significant (zero) is encoded as 0. If a coefficient is significant, that is non-zero, and it is not the last such significant coefficient in the block, then it is encoded as 10. If the coefficient is the last significant coefficient in the block, then it is encoded as 11. If the coefficient is significant and is also the last possible coefficient in the block, then it is encoded as 10. Such a coefficient would be known as the last coefficient in the block by a count of the block coefficients.

A straight forward manner of CABAC decoding such data employs a series of conditional branches. Such conditional branching code is not well matched to a pipelined data processor which experiences a pipeline hit upon each conditional branch. Each taken conditional branch requires that later instructions already partially executed within the pipeline to be aborted and new instructions need be processed within the pipeline. This serves to place a limit on processing speed because data processors tend to be more deeply pipelined at higher operating frequencies. Software loop unrolling may reduce this problem. In any event, conventional CABAC decoding is not well matched to exploiting instruction level parallelism of a very long instruction word (VLIW) data processor such as the Texas Instruments TMS320C6000 series.

SUMMARY OF THE INVENTION

This invention is computer implemented method of encoding video data into a compressed form. Encoding each macroblock in a frame of video data stores Context based Adaptive Binary Arithmetic Coding (CABAC) data in first and second CABAC engine registers. Encoding each new macroblock overwrites Context based Adaptive Binary Arithmetic Coding (CABAC) data into one of the first and second CABAC engine registers. Each macroblock is classified into either a first type having recoverable CABAC engine registers or a second type having non-recoverable CABAC engine registers based upon intermediate variable data. The method operates to close a slice of data if the current macroblock and any end of slice data exceed a slice data size limit.

If the macroblock immediately previous to the current macroblock is the first type, then the method restores the CABAC engine registers for the immediately previous macroblock, sets a pointer to point to the immediately previous macroblock and ends the current slice following this immediately previous macroblock.

If the macroblock immediately previous to the current macroblock is the second type, then the method checks the classification of the macroblock before this previous macroblock. If the macroblock before this previous macroblock is the first type, the method then restores the CABAC engine registers for the macroblock before the previous macroblock, sets a pointer to point to the macroblock before the previous macroblock and ends the current slice following this macroblock. If the macroblock before macroblock previous the said current macroblock is said second type, then the method re-encodes re-encoding the macroblock before the previous macroblock, sets a pointer to point to this macroblock before the previous macroblock and ends the current slice following this macroblock before the previous macroblock.

The step of classifying each current macroblock includes determining whether the following conditions are met by the macroblock ((codIRange 0x1fc) &&
(codIRange 0x1fe||bitOutStanding≠0)).

If the current macroblock meets these conditions it is the first type. Otherwise it is the second type.

BRIEF DESCRIPTION OF THE DRAWINGS

These and other aspects of this invention are illustrated in the drawings, in which:

FIG. 4 illustrates the instruction syntax of the very long instruction word digital signal processor core illustrated in FIG. 2 (prior art);

FIG. 5 illustrates an overview of the video encoding process of the prior art;

DETAILED DESCRIPTION OF PREFERRED EMBODIMENTS

Figure 1:
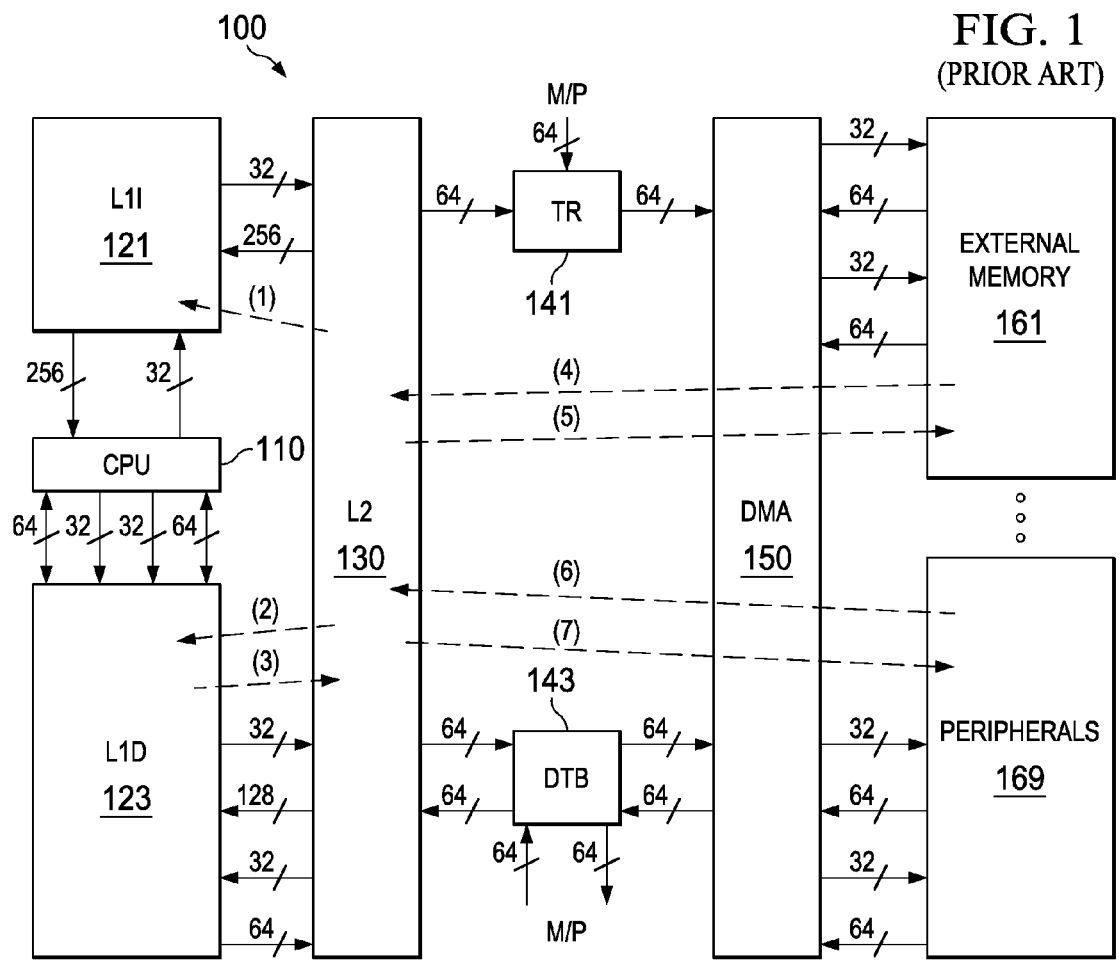
FIG. 1 illustrates the organization of a typical digital signal processor to which this invention is applicable (prior art)

FIG. 1 illustrates the organization of a typical digital signal processor system 100 to which this invention is applicable (prior art). Digital signal processor system 100 includes central processing unit core 110. Central processing unit core 110 includes the data processing portion of digital signal processor system 100. Central processing unit core 110 could be constructed as known in the art and would typically includes a register file, an integer arithmetic logic unit, an integer multiplier and program flow control units. An example of an appropriate central processing unit core is described below in conjunction with FIGS. 2 to 4.

Digital signal processor system 100 includes a number of cache memories. FIG. 1 illustrates a pair of first level caches. Level one instruction cache (L1I) 121 stores instructions used by central processing unit core 110. Central processing unit core 110 first attempts to access any instruction from level one instruction cache 121. Level one data cache (L1D) 123 stores data used by central processing unit core 110. Central processing unit core 110 first attempts to access any required data from level one data cache 123. The two level one caches are backed by a level two unified cache (L2) 130. In the event of a cache miss to level one instruction cache 121 or to level one data cache 123, the requested instruction or data is sought from level two unified cache 130. If the requested instruction or data is stored in level two unified cache 130, then it is supplied to the requesting level one cache for supply to central processing unit core 110. As is known in the art, the requested instruction or data may be simultaneously supplied to both the requesting cache and central processing unit core 110 to speed use.

Level two unified cache 130 is further coupled to higher level memory systems. Digital signal processor system 100 may be a part of a multiprocessor system. The other processors of the multiprocessor system are coupled to level two unified cache 130 via a transfer request bus 141 and a data transfer bus 143. A direct memory access unit 150 provides the connection of digital signal processor system 100 to external memory 161 and external peripherals 169.

Figure 2:
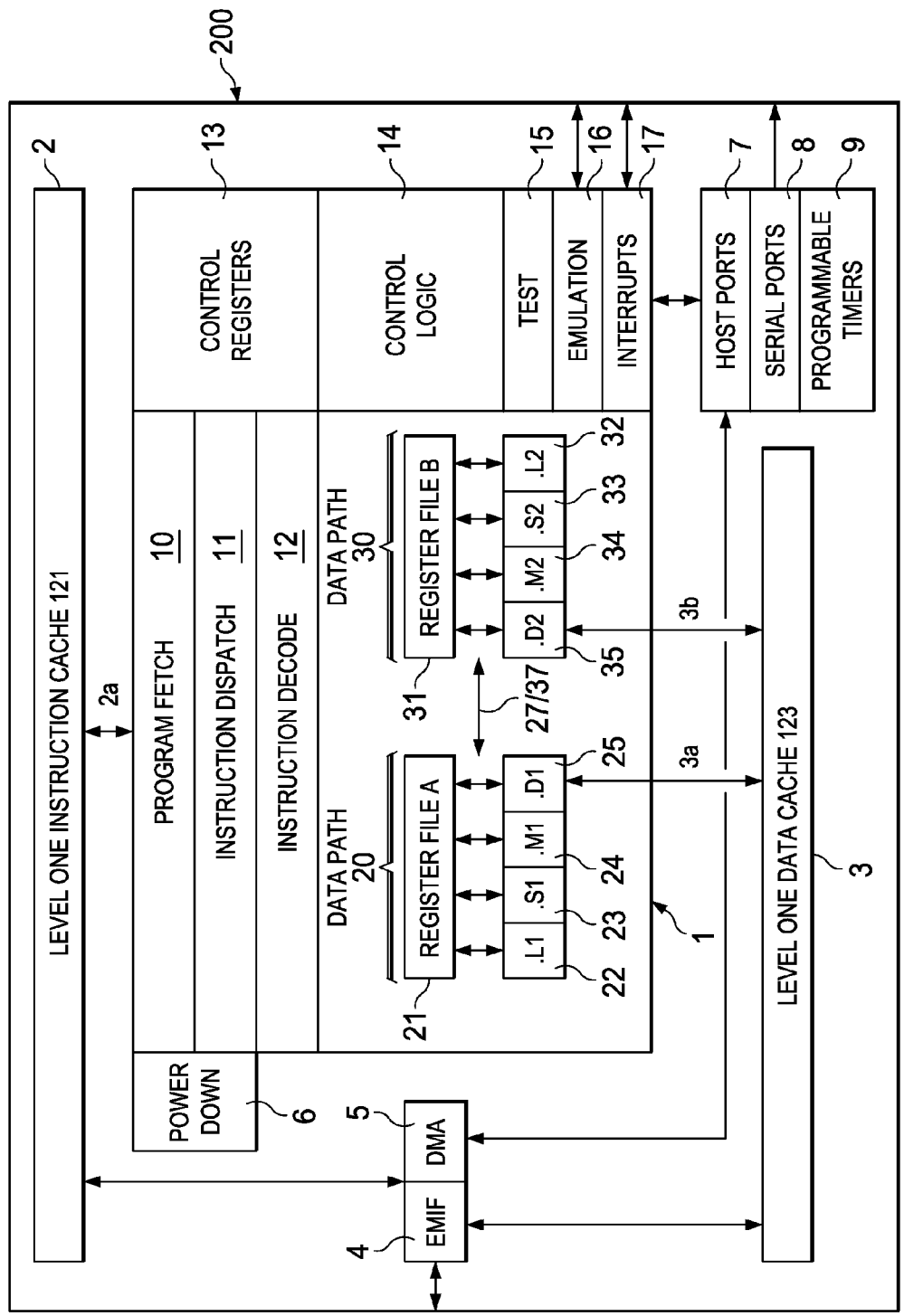
FIG. 2 illustrates details of a very long instruction word digital signal processor core suitable for use in FIG. 1 (prior art)

FIG. 2 is a block diagram illustrating details of a digital signal processor integrated circuit 200 suitable but not essential for use in this invention (prior art). The digital signal processor integrated circuit 200 includes central processing unit 1, which is a 32-bit eight-way VLIW pipelined processor. Central processing unit 1 is coupled to level 1 instruction cache 121 included in digital signal processor integrated circuit 200. Digital signal processor integrated circuit 200 also includes level one data cache 123. Digital signal processor integrated circuit 200 also includes peripherals 4 to 9. These peripherals preferably include an external memory interface (EMIF) 4 and a direct memory access (DMA) controller 5. External memory interface (EMIF) 4 preferably supports access to supports synchronous and asynchronous SRAM and synchronous DRAM. Direct memory access (DMA) controller 5 preferably provides 2-channel auto-boot loading direct memory access. These peripherals include power-down logic 6. Power-down logic 6 preferably can halt central processing unit activity, peripheral activity, and phase lock loop (PLL) clock synchronization activity to reduce power consumption. These peripherals also include host ports 7, serial ports 8 and programmable timers 9.

Central processing unit 1 has a 32-bit, byte addressable address space. Internal memory on the same integrated circuit is preferably organized in a data space including level one data cache 123 and a program space including level one instruction cache 121. When off-chip memory is used, preferably these two spaces are unified into a single memory space via the external memory interface (EMIF) 4.

Level one data cache 123 may be internally accessed by central processing unit 1 via two internal ports 3a and 3b. Each internal port 3a and 3b preferably has 32 bits of data and a 32-bit byte address reach. Level one instruction cache 121 may be internally accessed by central processing unit 1 via a single port 2a. Port 2a of level one instruction cache 121 preferably has an instruction-fetch width of 256 bits and a 30-bit word (four bytes) address, equivalent to a 32-bit byte address.

Central processing unit 1 includes program fetch unit 10, instruction dispatch unit 11, instruction decode unit 12 and two data paths 20 and 30. First data path 20 includes four functional units designated L1 unit 22, S1 unit 23, M1 unit 24 and D1 unit 25 and 16 32-bit A registers forming register file 21. Second data path 30 likewise includes four functional units designated L2 unit 32, S2 unit 33, M2 unit 34 and D2 unit 35 and 16 32-bit B registers forming register file 31. The functional units of each data path access the corresponding register file for their operands. There are two cross paths 27 and 37 permitting access to one register in the opposite register file each pipeline stage. Central processing unit 1 includes control registers 13, control logic 14, and test logic 15, emulation logic 16 and interrupt logic 17.

Program fetch unit 10, instruction dispatch unit 11 and instruction decode unit 12 recall instructions from level one instruction cache 121 and deliver up to eight 32-bit instructions to the functional units every instruction cycle. Processing occurs in each of the two data paths 20 and 30. As previously described above each data path has four corresponding functional units (L, S, M and D) and a corresponding register file containing 16 32-bit registers. Each functional unit is controlled by a 32-bit instruction. The data paths are further described below. A control register file 13 provides the means to configure and control various processor operations.

Figure 3:
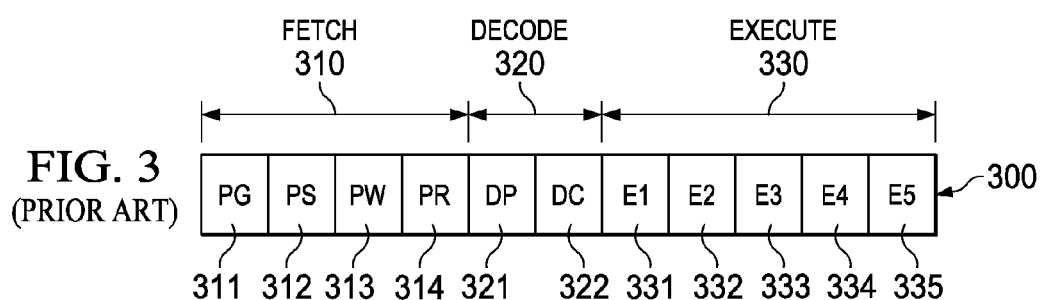
FIG. 3 illustrates the pipeline stages of the very long instruction word digital signal processor core illustrated in FIG. 2 (prior art)

FIG. 3 illustrates the pipeline stages 300 of digital signal processor core 110 (prior art). These pipeline stages are divided into three groups: fetch group 310; decode group 320; and execute group 330. All instructions in the instruction set flow through the fetch, decode, and execute stages of the pipeline. Fetch group 310 has four phases for all instructions, and decode group 320 has two phases for all instructions. Execute group 330 requires a varying number of phases depending on the type of instruction.

The fetch phases of the fetch group 310 are: Program address generate phase 311 (PG); Program address send phase 312 (PS); Program access ready wait stage 313 (PW); and Program fetch packet receive stage 314 (PR). Digital signal processor core 110 uses a fetch packet (FP) of eight instructions. All eight of the instructions proceed through fetch group 310 together. During PG phase 311, the program address is generated in program fetch unit 10. During PS phase 312, this program address is sent to memory. During PW phase 313, the memory read occurs. Finally during PR phase 314, the fetch packet is received at CPU 1.

The decode phases of decode group 320 are: Instruction dispatch (DP) 321; and Instruction decode (DC) 322. During the DP phase 321, the fetch packets are split into execute packets. Execute packets consist of one or more instructions which are coded to execute in parallel. During DP phase 322, the instructions in an execute packet are assigned to the appropriate functional units. Also during DC phase 322, the source registers, destination registers and associated paths are decoded for the execution of the instructions in the respective functional units.

The execute phases of the execute group 330 are: Execute 1 (E1) 331; Execute 2 (E2) 332; Execute 3 (E3) 333; Execute 4 (E4) 334; and Execute 5 (E5) 335. Different types of instructions require different numbers of these phases to complete. These phases of the pipeline play an important role in understanding the device state at CPU cycle boundaries.

During E1 phase 331, the conditions for the instructions are evaluated and operands are read for all instruction types. For load and store instructions, address generation is performed and address modifications are written to a register file. For branch instructions, branch fetch packet in PG phase 311 is affected. For all single-cycle instructions, the results are written to a register file. All single-cycle instructions complete during the E1 phase 331.

During the E2 phase 332, for load instructions, the address is sent to memory. For store instructions, the address and data are sent to memory. Single-cycle instructions that saturate results set the SAT bit in the control status register (CSR) if saturation occurs. For single cycle 16×16 multiply instructions, the results are written to a register file. For M unit non-multiply instructions, the results are written to a register file. All ordinary multiply unit instructions complete during E2 phase 322.

During E3 phase 333, data memory accesses are performed. Any multiply instruction that saturates results sets the SAT bit in the control status register (CSR) if saturation occurs. Store instructions complete during the E3 phase 333.

During E4 phase 334, for load instructions, data is brought to the CPU boundary. For multiply extensions instructions, the results are written to a register file. Multiply extension instructions complete during the E4 phase 334.

During E5 phase 335, load instructions write data into a register. Load instructions complete during the E5 phase 335.

FIG. 4 illustrates an example of the instruction coding of instructions used by digital signal processor core 110 (prior art). Each instruction consists of 32 bits and controls the operation of one of the eight functional units. The bit fields are defined as follows. The creg field (bits 29 to 31) is the conditional register field. These bits identify whether the instruction is conditional and identify the predicate register. The z bit (bit 28) indicates whether the predication is based upon zero or not zero in the predicate register. If z=1, the test is for equality with zero. If z=0, the test is for nonzero. The case of creg=0 and z=0 is treated as always true to allow unconditional instruction execution. The creg field is encoded in the instruction opcode as shown in Table 1.

TABLE 1

| Conditional Register | creg | | | z |
|---|---|---|---|---|
| | 31 | 30 | 29 | 28 |
| Unconditional | 0 | 0 | 0 | 0 |
| Reserved | 0 | 0 | 0 | 1 |
| B0 | 0 | 0 | 1 | z |
| B1 | 0 | 1 | 0 | z |
| B2 | 0 | 1 | 1 | z |
| A1 | 1 | 0 | 0 | z |
| A2 | 1 | 0 | 1 | z |
| A0 | 1 | 1 | 0 | z |
| Reserved | 1 | 1 | 1 | x |

Note that "z" in the z bit column refers to the zero/not zero comparison selection noted above and "x" is a don't care state. This coding can only specify a subset of the 32 registers in each register file as predicate registers. This selection was made to preserve bits in the instruction coding.

The dst field (bits 23 to 27) specifies one of the 32 registers in the corresponding register file as the destination of the instruction results.

The scr2 field (bits 18 to 22) specifies one of the 32 registers in the corresponding register file as the second source operand.

The scr1/cst field (bits 13 to 17) has several meanings depending on the instruction opcode field (bits 3 to 12). The first meaning specifies one of the 32 registers of the corresponding register file as the first operand. The second meaning is a 5-bit immediate constant. Depending on the instruction type, this is treated as an unsigned integer and zero extended to 32 bits or is treated as a signed integer and sign extended to 32 bits. Lastly, this field can specify one of the 32 registers in the opposite register file if the instruction invokes one of the register file cross paths 27 or 37.

The opcode field (bits 3 to 12) specifies the type of instruction and designates appropriate instruction options. A detailed explanation of this field is beyond the scope of this invention except for the instruction options detailed below.

The s bit (bit 1) designates the data path 20 or 30. If s=0, then data path 20 is selected. This limits the functional unit to L1 unit 22, S1 unit 23, M1 unit 24 and D1 unit 25 and the corresponding register file A 21. Similarly, s=1 selects data path 20 limiting the functional unit to L2 unit 32, S2 unit 33, M2 unit 34 and D2 unit 35 and the corresponding register file B 31.

The p bit (bit 0) marks the execute packets. The p-bit determines whether the instruction executes in parallel with the following instruction. The p-bits are scanned from lower to higher address. If p=1 for the current instruction, then the next instruction executes in parallel with the current instruction. If p=0 for the current instruction, then the next instruction executes in the cycle after the current instruction. All instructions executing in parallel constitute an execute packet. An execute packet can contain up to eight instructions. Each instruction in an execute packet must use a different functional unit.

FIG. 5 illustrates the encoding process 500 of video encoding according to the prior art. Many video encoding standards use similar processes such as represented in FIG. 5. Encoding process 500 begins with the n th frame $F_n$ 501. Frequency transform block 502 transforms a macroblock of the pixel data into the spatial frequency domain. This typically involves a discrete cosine transform (DCT). This frequency domain data is quantized in quantization block 503. This quantization typically takes into account the range of data values for the current macroblock. Thus differing macroblocks may have differing quantizations. In accordance with the H.264 standard, in the base profile the macroblock data may be arbitrarily reordered via reorder block 504. As will be explained below, this reordering is reversed upon decoding. Other video encoding standards and the H.264 main profile transmit data for the macroblocks in strict raster scan order. The quantized data is encoded by entropy encoding block 505. Entropy encoding employs fewer bits to encode more frequently used symbols and more bits to encode less frequency used symbols. This process reduces the amount of encoded that must be transmitted and/or stored. The resulting entropy encoded data is the encoded data stream. This invention concerns content based adaptive arithmetic coding (CABAC) which will be further described below.

Video encoding standards typically permit two types of predictions. In inter-frame prediction, data is compared with data from the corresponding location of another frame. In intra-frame prediction, data is compared with data from another location in the same frame.

For inter prediction, data from n−1 th frame $F_{n-1}$ 510 and data from the current frame $F_n$ 501 supply motion estimation block 511. Motion estimation block 511 determines the positions and motion vectors of moving objects within the picture. This motion data is supplied to motion compensation block 512 along with data from frame $F_{n-1}$ 510. The resulting motion compensated frame data is selected by switch 513 for application to subtraction unit 506. Subtraction unit 506 subtracts the inter prediction data from switch 513 from the input frame data from current frame $F_n$ 501. Thus frequency transform block 502, quantization block 503, reorder block 504 and entropy encoding block 505 encode the differential data rather than the original frame data. Assuming there is relatively little change from frame to frame, this differential data has a smaller magnitude than the raw frame data. Thus this can be expressed in fewer bits contributing to data compression. This is true even if motion estimation block 511 and motion compensation block 512 find no moving objects to code. If the current frame $F_{n-1}$ and the prior frame $F_{n-1}$ are identical, the subtraction unit 506 will produce a string of zeros for data. This data string can be encoded using few bits.

The second type of prediction is intra prediction. Intra prediction predicts a macroblock of the current frame from another macroblock of that frame. Inverse quantization block 520 receives the quantized data from quantization block 503 and substantially recovers the original frequency domain data. Inverse frequency transform block 521 transforms the frequency domain data from inverse quantization block 520 back to the spatial domain. This spatial domain data supplies one input of addition unit 522, whose function will be further described. Encoding process 500 includes choose intra predication unit 514 to determine whether to implement intra prediction. Choose intra prediction unit 514 receives data from current frame $F_n$ 501 and the output of addition unit 522. Choose intra prediction unit 514 signals intra prediction intra predication unit 515, which also receives the output of addition unit 522. Switch 513 selects the intra prediction output for application to the subtraction input of subtraction units 506 and an addition input of addition unit 522. Intra prediction is based upon the recovered data from inverse quantization block 520 and inverse frequency transform block 521 in order to better match the processing at decoding. If the encoding used the original frame, there might be drift between these processes resulting in growing errors.

Video encoders typically periodically transmit unpredicted frames. In such an event the predicted frame is all 0's. Subtraction unit 506 thus produces data corresponding to the current frame $F_n$ 501 data. Periodic unpredicted or I frames limits any drift between the transmitter coding and the receive decoding. In a video movie a scene change may produce such a large change between adjacent frames that differential coding provides little advantage. Video coding standards typically signal whether a frame is a predicted frame and the type of prediction in the transmitted data stream.

Encoding process 500 includes reconstruction of the frame based upon this recovered data. The output of addition unit 522 supplies deblock filter 523. Deblock filter 523 smoothes artifacts created by the block and macroblock nature of the encoding process. The result is reconstructed frame $F'_n$ 524. As shown schematically in FIG. 5, this reconstructed frame $F'_n$ 524 becomes the next reference frame $F_{n-1}$ 510.

Figure 6:
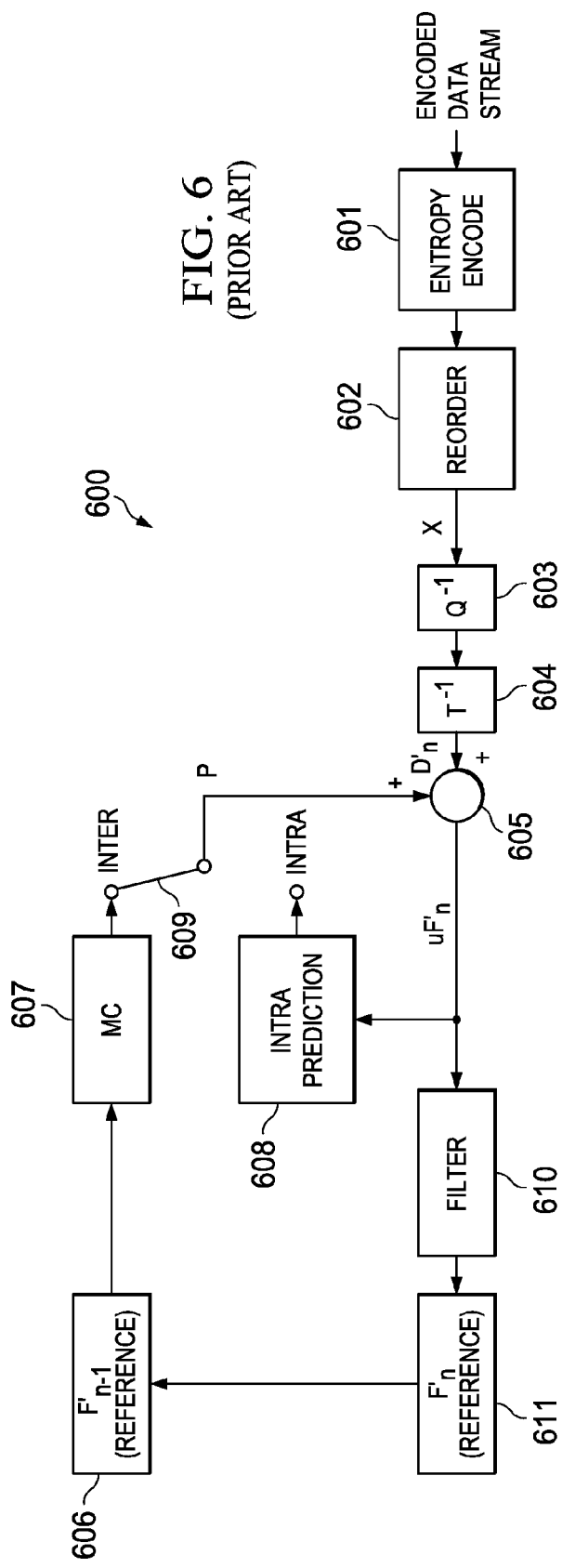
FIG. 6 illustrates an overview of the video decoding process of the prior art.

FIG. 6 illustrates the corresponding decoding process 600. Entropy decode unit 601 receives the encoded data stream. Entropy decode unit 601 recovers the symbols from the entropy encoding of entropy encoding unit 505. This invention is applicable to CABAC decoding. Reorder unit 602 assembles the macroblocks in raster scan order reversing the reordering of reorder unit 504. Inverse quantization block 603 receives the quantized data from reorder unit 602 and substantially recovers the original frequency domain data. Inverse frequency transform block 604 transforms the frequency domain data from inverse quantization block 603 back to the spatial domain. This spatial domain data supplies one input of addition unit 605. The other input of addition input 605 comes from switch 609. In inter mode switch 609 selects the output of motion compensation unit 607. Motion compensation unit 607 receives the reference frame $F'_{n-1}$ 606 and applies the motion compensation computed by motion compensation unit 512 and transmitted in the encoded data stream.

Switch 609 may also select intra prediction. The intra prediction is signaled in the encoded data stream. If this is selected, intra prediction unit 608 forms the predicted data from the output of adder 605 and then applies the intra prediction computed by intra prediction block 515 of the encoding process 500. Addition unit 605 recovers the predicted frame. As previously discussed in conjunction with encoding, it is possible to transmit an unpredicted or I frame. If the data stream signals that a received frame is an I frame, then the predicted frame supplied to addition unit 605 is all 0's.

The output of addition unit 605 supplies the input of deblock filter 610. Deblock filter 610 smoothes artifacts created by the block and macroblock nature of the encoding process. The result is reconstructed frame $F'_n$ 611. As shown schematically in FIG. 6, this reconstructed frame $F'_n$ 611 becomes the next reference frame $F_{n-1}$ 606.

The deblocking filtering of deblock filter 523 and deblock 610 must be the same. This enables the decoding process to accurately reflect the input frame $F_n$ 501 without error drift. The H.264 standard has a specific, very detailed decision matrix and corresponding filter operations for this process. The standard deblock filtering is applied to every macroblock in raster scan order. This deblock filtering smoothes artifacts created by the block and macroblock nature of the encoding. The filtered macroblock is used as the reference frame in predicted frames in both encoding and decoding. The encoding and decoding apply the identical processing the reconstructed frame to reduce the residual error after prediction.

Blocks 501, 502, 503, 504, 506, 506, 510, 51, 512, 513, 514, 515, 520, 521, 522, 523 and 524 of FIG. 5 and blocks 601, 602, 603, 604, 605, 606, 607, 608, 610 and 611 of FIG. 6 as well as other processes described below may be achieved via programmed operation of central processing unit 110 and/or via special purpose hardware included as part of peripherals 169 operating under the control of central processing unit 110. The selection of software or hardware to implement a particular function for any practical system is a design choice based upon the hardware budget of an integrated circuit performing the operations, the relative computation power of central processing unit 110 and other factors. Other relevant factors include the availability of previously written software modules or previously designed hardware modules.

Figure 7:
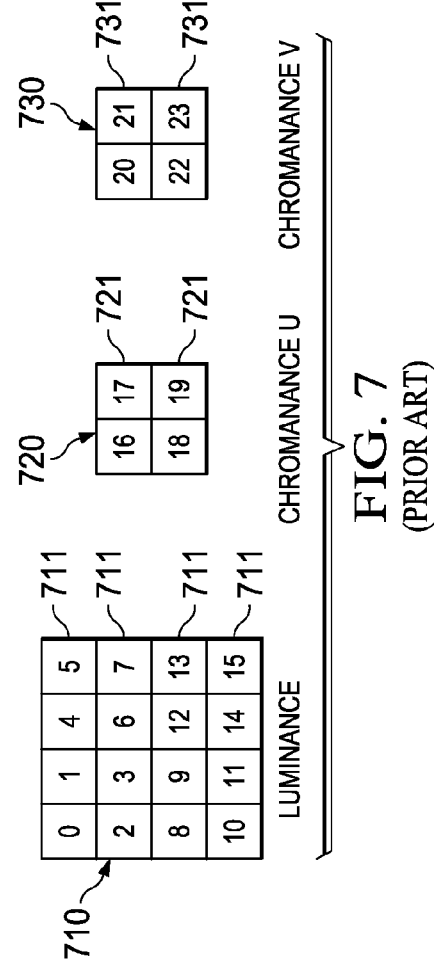
FIG. 7 illustrates division of a 16 by 16 block of luminance data into sixteen 4 by 4 sub-blocks and similar division of two 8 by 8 chrominance blocks into four each 4 by 4 sub-blocks (prior art)
Figure 8:
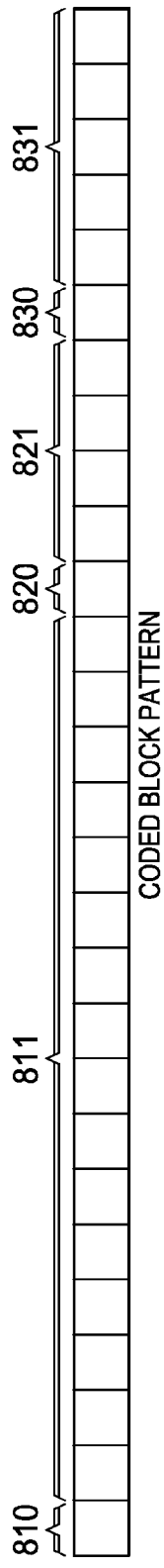
FIG. 8 illustrates the coding of a coded block pattern corresponding to the block data illustrated in FIG. 7.

FIGS. 7 and 8 illustrate a typical technique for compressing data in video coding. FIG. 7 illustrates a 16 by 16 block of frequency domain transformed luminance data 710 divided into sixteen 4 by 4 sub-blocks 711. These are numbered 0 to 15. FIG. 7 also illustrates corresponding chrominance data. Chrominance U data 720 is an 8 by 8 block covering the same area as luminance block 710. Human perception is more sensitive to luminance data than chrominance data, therefore it is typical to transmit chrominance data at a lower resolution. Chrominance U data 720 includes four 4 by 4 sub-blocks 721. FIG. 7 further illustrates an 8 by 8 block chrominance V data 730 formed of four 4 by 4 sub-blocks 731.

FIG. 8 illustrates a coded block pattern indicative of the status of corresponding parts of the data represented in FIG. 7. In the H.264 standard the coded block pattern is coded differently based upon the selected block type. For intra predicted 16 by 16 blocks, field 810 indicates whether the DC term of all sixteen (0 to 15) of the 4 by 4 sub-blocks in block 710 are zero. If all these DC terms are zero, then field 810 is 0. If any of these DC terms are non-zero, then field 810 is 1. For intra predicted 16 by 16 blocks, field 811 indicates whether any AC data for a corresponding sub-block 711 of luminance data 710 is zero or non-zero. In the H.264 standard the bit of field 811 is 0 if there is no non-zero AC coefficient data for the corresponding sub-block 711 and 1 if any AC coefficient is non-zero. Blocks other than intra predicted 16 by 16 blocks are coded slightly differently. For these other block types, field 810 though present includes no coded information. Thus field 810 is a don't care. For these other block types, field 811 indicates whether any data (DC or AC) for a corresponding sub-block 711 of luminance data 710 is zero or non-zero. In the H.264 standard the bit of field 811 is 0 if there is no non-zero coefficient data for the corresponding sub-block 711 and 1 if any coefficient is non-zero.

Fields 820, 821, 830 and 831 are coded the same for all block types. Field 820 is a single bit indicating whether the DC components of the whole block 720 are all zero or not all zero. Field 821 is four bits. Each bit of field 821 indicates if the AC terms of the corresponding sub-blocks 721 are all zero or not all zero. Fields 830 and 831 are similarly coded for block 730.

The coding in the coded block pattern enables data compression. The encoder 500 need not provide any data corresponding to all zero sub-blocks as indicated by the corresponding bit of the code bit pattern. The particular coding in the coded block pattern is a design choice. This coding order must be known to both the encoder 500 and the decoder 600. Note that the existence of all zero sub-blocks does not indicate that the original image is devoid of corresponding data. An all zero sub-block merely indicates that within the range coded according to the selected quantization, the image data matches the prediction data.

The encoder 500 supplies a significance map for each non-zero (significant) sub-block. This significance map indicates whether data for the corresponding coefficient in the 4 by 4 block is non-zero. In the coding technique of this example, this significance map data is CABAC encoded. This CABAC encoding includes two context map arrays, each array having a context corresponding to a position of the corresponding coefficient. In this example, entropy encoding block 505 encodes a 0 if the corresponding coefficient in the 4 by 4 sub-block is zero. If the corresponding coefficient in the 4 by 4 sub-block is not zero, entropy encoding block 505 uses two bits for encoding. The first bit is always 1. The second bit is 0 if the corresponding non-zero coefficient is not the last non-zero coefficient in the 4 by 4 sub-block. The second bit is 1 if the corresponding non-zero coefficient is the last non-zero coefficient in the 4 by 4 sub-block. If the last possible coefficient in the 4 by 4 block is non-zero (end of sub-block), it is coded as 10. This coding is shown in Table 2.

TABLE 2

| Encoded Bits | Meaning |
| --- | --- |
| 0 | Coefficient zero |
| 10 | Coefficient non-zero and not last non-zero coefficient, or non-zero and end of sub-block |
| 11 | Coefficient non-zero and last non-zero coefficient |

This coding provides compression because no data is encoded for a coefficient with a magnitude that the significance map indicates is zero. The end of sub-block code 11 permits all final zero coefficients to be omitted. The significance map enables the following significant coefficient magnitude data to be recognized and decoded without having to transmit non-significant data.

The international standard ITU-T H.241 establishes the rules to use H.264 video coding/decoding (codec) in video communication. The ITU-T H.241 standard limits the size of maximum transmission unit (MTU) of an IP-network by constrains on the size of NAL units. NAL units shorter than the MTU size of the network avoid IP-layer packet fragmentation. For H.264 video streams the limit of NAL unit size is 1400 bytes. The video encoder determines the maximum size of slices to keep the limit of NAL unit size and encodes the bitstream not to exceed this maximum size of a slice.

In H.264 video bitstreams one slice includes a slice header and one or more macroblocks. The video encoder controls the number of macroblocks in a slice to limit the slice size. Video encoders typically use an encoded bits estimation model to determine the number of macroblocks included within a slice at an early stage. The number of encoded bits of a macroblock cannot be known before generating encoded bits. Thus estimation of the encoded bits sometimes fails. If during macroblock encoding the total of encoded bits in the slice exceed the maximum size of a slice, then video encoder abort the encoded bits for the current macroblock, rewind the bit pointer and the status of video encoder so that video encoder can re-encode the previous macroblock as the last macroblock of slice. This operation is called macroblock rewind and end of slice creation.

Figure 9:
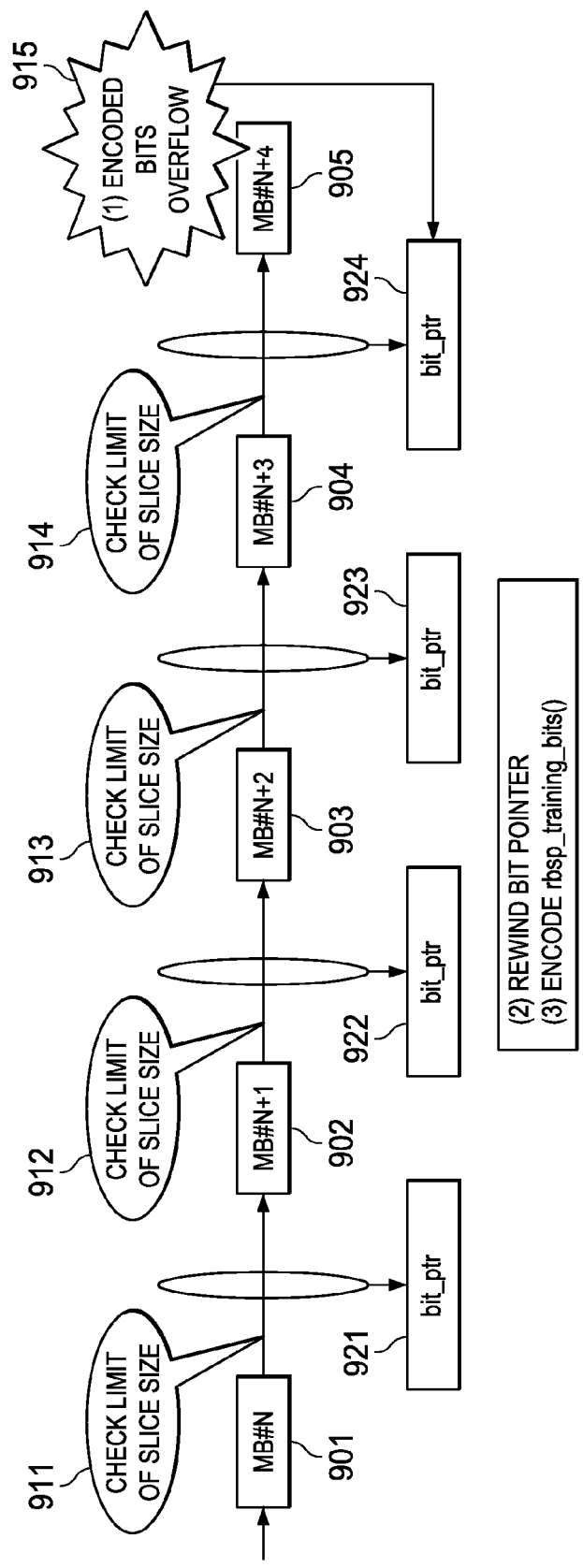
FIG. 9 illustrates an example of a content adaptive variable length coder encoder rewind (prior art)

FIG. 9 illustrates an example dataflow of macroblock rewind and end of slice creation in content adaptive variable length coder (CAVLC) encoder to keep the limit of slice size. For all macroblocks, video encoder does the following. During and/or after encoding macroblock, the video encoder checks if total encoded bits in slice plus the bits to be encoded at the end of slice do not exceed the limit of slice size. These end of slice bits includes rbsp_trailing_bits( ). If the last macroblock in slice is a skipped macroblock, the term mb_skip_run which indicates the number of contiguous skipped macroblocks should be encoded. The video encoder may also need to include emulation prevention bytes (EPBs).

Thus the bits to be encoded at the end of slice are the rbsp_trailing_bits( ), mb_skip_run and EPBs.

FIG. 9 illustrates production of successive macroblocks 901, 902, 903, 904 and 905. Following each macroblock a corresponding check block 911, 912, 913, 914 and 915 checks to determine if adding the current macroblock plus the required end of slice bits exceeds the limit of slice size.

If video encoder determines the calculated bits do not exceed the slice limit (blocks 911, 912, 913 and 914), then the video encoder keeps bit pointer at the end of macroblock encoding. In the example of FIG. 9 macroblocks 901, 902, 903 and 904 do not exceed the limit. In these cases bit pointer blocks 921, 922, 923 and 924 reset a bit pointer to the end of the just checked macroblock data.

If video encoder determines the calculated bits exceed the slice limit (block 915), then the video encoder should rewind macroblock and create an end of slice. In the example of FIG. 9 encoding macroblock 905 exceeds the slice limit. This condition requires execution of a rewind further described below.

The bit pointers for macroblocks 901, 902 and 903 can be saved to the same location. The bit pointer of macroblock 901 is not required after determining that total encoded bits after macroblock 902 do not exceed the limit of slice size. Thus under these conditions the bit pointer after macroblock 902 can overwrite the bit pointer after macroblock 901. This is not the case for the bit pointer after macroblock 903 where adding the bits of macroblock 904.

The rewind and end of slice creation for CAVLC is as follows. Note this condition is triggered by an overflow condition (1) following macroblock 905. This condition triggers a rewind the bit pointer (2) to the bit pointer after the prior macroblock 904. This condition also triggers an encoding of rbsp_trailing_bits( ) (3) from the bit pointer to close the current slice. This end of slice encoding makes macroblock 904 the last macroblock in the current slice. CAVLC macroblock rewind and end of slice creation is simple because macroblock 904 becomes the last macroblock in slice by adding rbsp_trailing_bits( ) after macroblock 904 encoding.

Context based Adaptive Binary Arithmetic Coding (CABAC) macroblock rewind and end of slice creation is more complex than CAVLC. This difference occurs because CABAC employs an end_of_slice_flag syntax element in the macroblock layer. Macroblocks whose bits do not cause the slice limit to overflow are encoded with an end_of_slice_flag equal to 0. This indicates the current macroblock is not the end of slice. When the video encoder detects an overflow of the limit of slice, the end_of_slice_flag of the previous macroblock should be re-encoded equal to 1 indicating the current macroblock is the end of slice. Thus more data needs to be changed for a macroblock rewind with a CABAC encoder than with a CAVLC encoder. In a CABAC macroblock rewind the video encoder needs to rewind CABAC encoder engine registers; codILow, codIRange, bitsOutstanding and encoded number of bins. These are required to encode bins in syntax elements in addition to bit pointer.

There are two prior art methods enabling CABAC macroblock rewind and end of slice creation.

Figure 10:
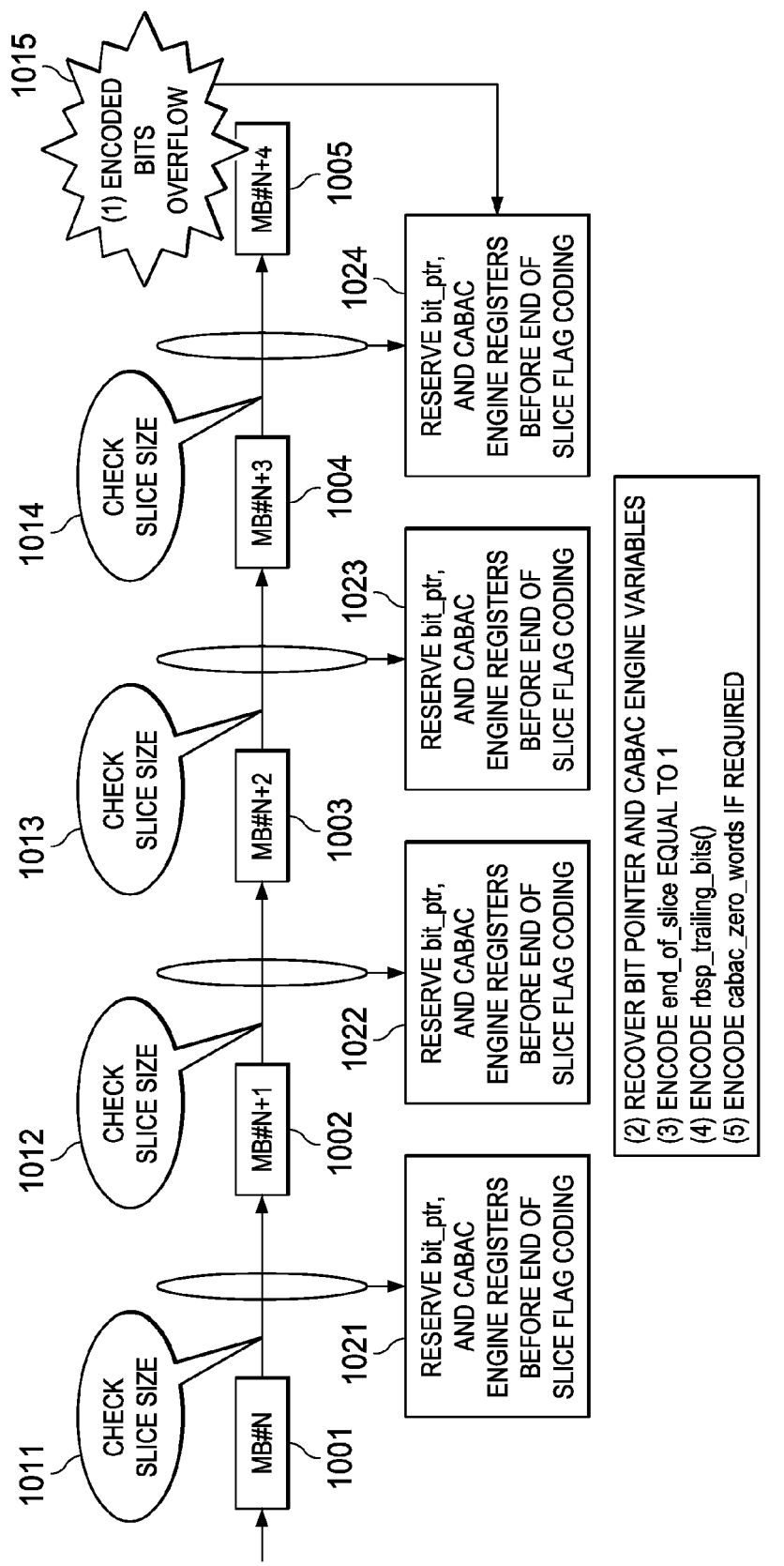
FIG. 10 illustrates an example of a first prior art context based adaptive binary arithmetic coding macroblock rewind method.

FIG. 10 illustrates an example of the first prior art method of CABAC macroblock rewind called the End_of_slice_flag re-encoding method. This method assumes the video encoder reserves CABAC encoder engine registers just before end_of_slice_flag encoding but not between macroblock encodings. FIG. 10 illustrates production of successive macroblocks 1001, 1002, 1003, 1004 and 1005. Following each macroblock a corresponding check block 1011, 1012, 1013, 1014 and 1015 checks to determine if adding the current macroblock and required end of slice bits exceeds the limit of slice size.

If video encoder determines the calculated bits do not exceed the slice limit (blocks 1011, 1012, 1013 and 1014), then the video encoder keeps bit pointer at the end of macroblock encoding. The video encoder also keeps the CABAC encoder engine registers just before the end_of_slice_flag encode of the CABAC encoder. In the example of FIG. 10 macroblocks 1001, 1002, 1003 and 1004 do not exceed the limit. In these cases blocks 1021, 1022, 1023 and 1024 reset a bit pointer to the end of the just checked macroblock data. The video encoder rewinds the CABAC registers to the contents of reserved registers, and CABAC encoder re-encodes end_of_slice_flag to 1.

All CABAC engine registers and bit pointers for macroblocks 1001, 1002, 1003 and 1004 can be saved to the same location. The CABAC engine registers and bit pointer of macroblock 1001 are not required after checking total encoded bits after determining that macroblock 1001 does not exceed the limit of slice size. Thus the CABAC engine registers and bit pointer of macroblock 1002 can overwrite those of macroblock 1001.

If video encoder determines the calculated bits exceed the limit (block 1015), then the video encoder rewinds the current macroblock and inserts the required end of slice bits. In the example of FIG. 10 encoding macroblock 1005 exceeds the slice limit. This condition requires execution of a rewind and is triggered by an overflow condition (1) following macroblock 1005. This condition triggers a rewind the bit pointer (2) to the bit pointer after the prior macroblock 1004 and recovery of the CABAC engine variables. This condition encodes (3) the end_of_slice_flag to 1. This condition also triggers an encoding of rbsp_trailing_bits( ) (4) from the bit pointer to close the current slice. This end of slice encoding makes macroblock 1004 the last macroblock in the current slice. This condition also triggers encoding of cabac_zero_words (5) if required. This condition may cause insertion of emulation prevention bytes (EPBs). The bits to be encoded at the end of slice are the bits required to encode them end_of_slice_flag, rbsp_trailing_bits( ) cabac_zero_words and EPBs. This codes macroblock 1004 as the last macroblock in the current slice This first prior art method requires the CABAC engine to be designed having the capability to reserve bit pointer and CABAC engine registers just before end_of_slice_flag coding. Such a CABAC engine requires high performance and is generally implemented in hardware. The hardware architecture determines whether the CABAC engine can reserve these register values just before end_of_slice_flag coding. This first prior art method cannot be used if the hardware architecture does not support this capability.

The second prior art method is called the full-macroblock re-encoding method. This second prior art method assumes that the CABAC engine registers cannot be reserved just before end_of_slice_flag coding, but can reserve CABAC engine registers between macroblock encodings. The video encoder reserves the bit pointer, the CABAC engine registers and the CABAC context variables after each macroblock encode. Instead of re-encoding the end_of_slice_flag, CABAC re-encodes all syntax elements in the previous macroblock when macroblock rewinding and end of slice creation in this second prior art method.

Figure 11:
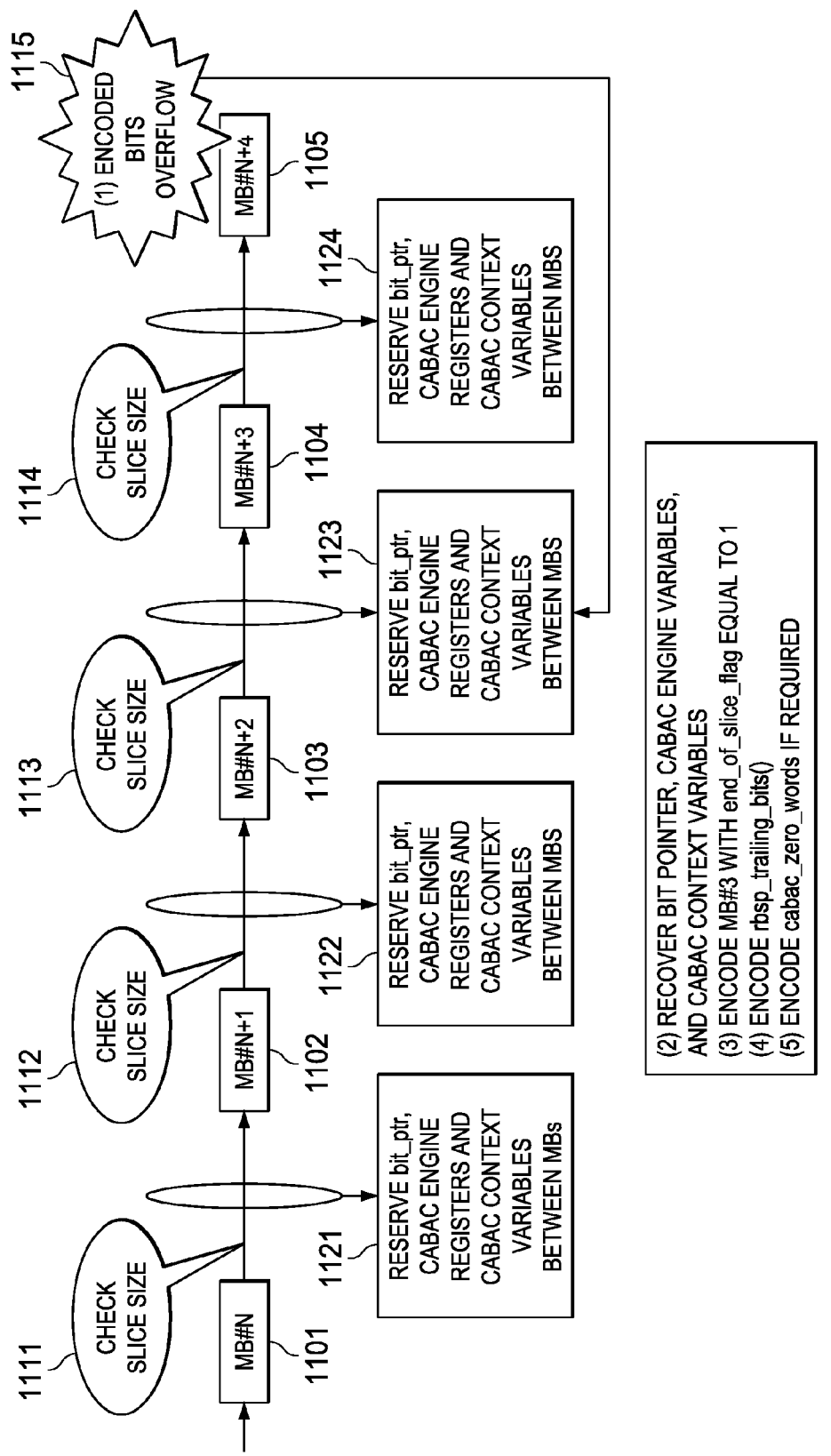
FIG. 11 illustrates an example of a second prior art context based adaptive binary arithmetic coding macroblock rewind method.

FIG. 11 illustrates an example of this second prior art method. FIG. 11 illustrates production of successive macroblocks 1101, 1102, 1103, 1104 and 1105. Following each macroblock a corresponding check block 1111, 1112, 1113,

1114 and 1115 checks to determine if adding the current macroblock plus the required end of slice bits exceeds the limit of slice size. At the end of the slice, the video encoder changes end_of_slice_flag equal to 1 and encodes rbsp_trailing_bits( ). If required the video encoder also encodes one or more cabac_zero_words inserted at the end of slice. Finally, the video encoder may also cause insertion of emulation prevention bytes (EPBs). The bits to be encoded at the end of slice thus included end_of_slice_flag, tbsp_trailing_bits( ), cabac_zero_words and EPBs.

If the video encoder determines the calculated bits do not exceed the slice limit (blocks 1111, 1112, 1113 and 1114), then the video encoder keeps bit pointer, CABAC engine registers, CABAC context variables after macroblock coding (blocks 1121, 1122, 1123 and 1124). In this case macroblocks 1101, 1102, 1103 and 1104 do not exceed the slice limit.

If the video encoder determines the calculated bits exceed the slice limit (block 1115), video encoder should rewind macroblock and create end of slice. In the example, during macroblock 1105 encoding, the encoded bits exceed the slice limit. Detection of this condition triggers execution of a rewind.

All CABAC engine registers and bit pointers for macroblocks 1101, 1102, 1103 and 1104 can be saved to the same location. The CABAC engine registers and bit pointer of macroblock 1101 are not required after checking total encoded bits after determining that macroblock 1102 do not exceed the limit of slice size. Thus the CABAC engine registers and bit pointer data of macroblock 1102 can overwrite the data of macroblock 1101.

The rewind and end of slice creation for the second prior art method illustrated in FIG. 11 is as follows. This rewind begins when block 1115 detects that addition of macroblock 1105 overflows the slice limit (1). The video encoder must then rewind the CABAC engine registers, CABAC context variables and bit pointer to the values before macroblock 1104 encoding (2). This is after encoding macroblock 1103. The video encoder then encoded all syntax elements for macroblock 1104 with end_of_slice_flag value equal to 1 (3). Next the video encoder encodes rbsp_trailing_bits( ) to close the current slice (4). Lastly, video encoder inserts cabac_zero_words at the end of the slice if required (5). These changes make macroblock 1104 the last macroblock in the current slice.

This second prior art method enables CABAC macroblock rewind even if video encoder does not support reserving the bit pointer and CABAC engine registers just before end_of_slice_flag. This second prior art method has a problem due to the large size of the CABAC context variables. For the high profile CABAC context variables are 464 bytes. If CABAC context buffer can reserve CABAC context variables in parallel with macroblock processing, no special cycles are required for the reserve. In the other cases, at least one overhead cycle is required to reserve them after each macroblock encoding.

This invention is a method to reduce the overhead cycle caused by the reserving CABAC context variables following every macroblock as required by the second prior art method described above. The basic idea of the method is as follows. If variables codIRange and bitOutStanding fulfill the following two conditions after macroblock encoding, all CABAC engine registers and bit pointer before end_of_slice_flag equal to 0 encoding can be recoverable from the CABAC engine registers and bit pointer after the end_of_slice_flag encoding. These two conditions are:

((codIRange 0x1fc) &&
(codIRange 0x1fe||bitOutStanding≠0)).

If codIRange=0x1fc, then the CABAC engine registers are not recoverable, this is called condition B (cond_B). The CABAC engine registers are also not recoverable if codIRange=0x1fe AND bitOutStanding=0. This is also condition B. If neither of these are true (or the converse noted above is true), this is called condition A (cond_A).

The variables codIRange and bitOutstanding are used in the standard computation of CABAC macroblock compression. The variable codIRange takes a value between 0x100 and 0x1fe after end of slice coding. The variable takes the range from 0 to the highest number representable in the selected data word size. This highest number would be $2^{32-1}$ for a 32-bit number. This application describes below why the CABAC engine registers are recoverable in this case.

If these conditions are true, only end_of_slice_flag re-encode is possible. The video encoder does not need to keep CABAC context variables. This can save the cycle normally required to reserve the CABAC context variables.

In this invention the video encoder does the following for all macroblocks. During and/or after encoding each macroblock, the video encoder checks to determine if the total encoded bits in the current slice plus the bits to be encoded at the end of slice exceed the slice size limit. At the end of a slice, the video encoder encodes an end_of_slice_flag equal to 1 and encodes rbsp_trailing_bits( ). If required, the video encoder inserts one or more cabac_zero_words at the end of the slice. The video encoder may also insert emulation prevention bytes (EPBs) at the end of the slice. Thus the video encoder encodes at the end of the slice the end_of_slice_flag, rbsp_trailing_bits( ), cabac_zero_words and EPBs.

If the video encoder determines the calculated bits exceed the limit (block 1115), then the video encoder should rewind macroblock and create and end of slice. The procedure of rewind and creation of end of slice depend on the conditions of the previous macroblock and the macroblock before the previous macroblock.

If video encoder determines the calculated bits do not exceed the limit, then the video encoder checks if CABAC engine registers after macroblock coding fulfill the following both conditions:

((codIRange 0x1fc) &&
(codIRange 0x1fe||bitOutStanding≠0)).

If both these conditions are true, then the video encoder keeps bit pointer and CABAC engine registers and sets the condition of this macroblock to cond_A. If one or more of these conditions are false, then the video encoder keeps bit pointer CABAC engine registers, CABAC context variables and sets the condition of this macroblock to cond_B.

This invention stores the latest two sets of CABAC engine registers, bit pointers and CABAC context variables. Older sets of variables than these latest two sets do not need to be stored. These older sets can be overwritten by the latest two sets.

The following describes the operation of this invention in rewind and end of slice creation flow for three cases. In the first case when the number of encoded bits overflow, the previous macroblock is cond_A. In the second case when the number of encoded bits overflow, the previous macroblock is cond_B and the macroblock before the previous macroblock is cond_B. In the third case when the number of encoded bits overflow, the previous macroblock is cond_B and the macroblock before the previous macroblock is cond_A.

Figure 12:
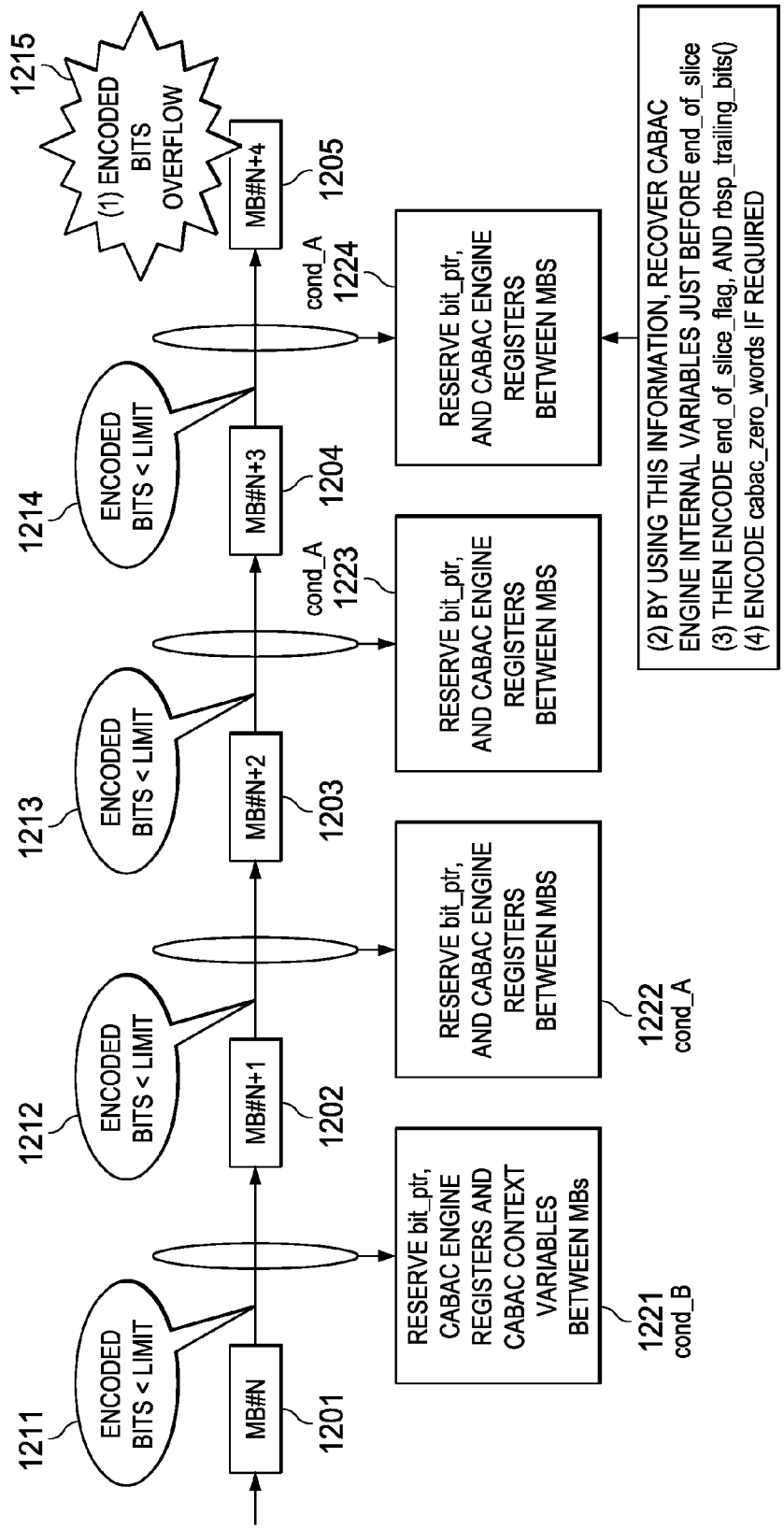
FIG. 12 illustrates an example a first embodiment of this invention.

FIG. 12 illustrates an example of operation of this invention in the first case where the previous macroblock is cond_A. FIG. 12 illustrates production of successive macroblocks 1201, 1202, 1203, 1204 and 1205. Following each macroblock a corresponding check block 1211, 1212, 1213,

1214 and 1215 checks to determine if adding the current macroblock plus the required end of slice bits exceeds the limit of slice size. Check blocks 1211, 1212, 1213, 1214 and 1215 also check the conditions listed above. In the example of FIG. 12 macroblock 1201 does not fulfill the codIRange and bitOutStanding conditions. Macroblock 1201 is thus marked as cond_B after the CABAC context variables are stored. Macroblocks 1202 to 1204 fulfill the conditions and are marked as cond_A.

Blocks 1221, 1222, 1223 and 1224 close the processing of a corresponding macroblock based upon whether that macroblock is marked cond_A or cond_B. Macroblock 1201 is marked cond_B. Thus block 1221 ends macroblock processing by reserving the bit pointer bit_ptr, the CABAC engine registers and CABAC context variables between macroclocks. Macroblocks 1202 to 1204 are marked cond_A. Thus blocks 1222 to 1224 end macroblock processing by reserving the bit pointer bit_ptr, the CABAC engine registers between macroblocks.

In the example of FIG. 12, during or at the end of processing macroblock 1205 the number encoded bits exceeds the limit of slice size (1) as detected by check block 1215. This determination triggers the rewind. Since macroblock 1204 is marked cond_A, the CABAC engine registers and bit pointer just before end_of_slice_flag are recoverable. Using the CABAC engine registers and bit pointer after macroblock 1204, the video encoder recovers bit pointer and CABAC engine registers to the values just before end_of_slice_flag coding (2). The video encoder encodes the end_of_slice_flag to 1 and encodes rbsp_trailing_bits( ) (3). Finally, the video encoder encodes cabac_zero_words if required (4).

In the example of FIG. 12, since macroblock 1203 is marked as cond_A and CABAC engine registers and bit pointer just before end_of_slice_flag are recoverable, the video encoder can re-encode the end_of_slice_flag only.

Figure 13:
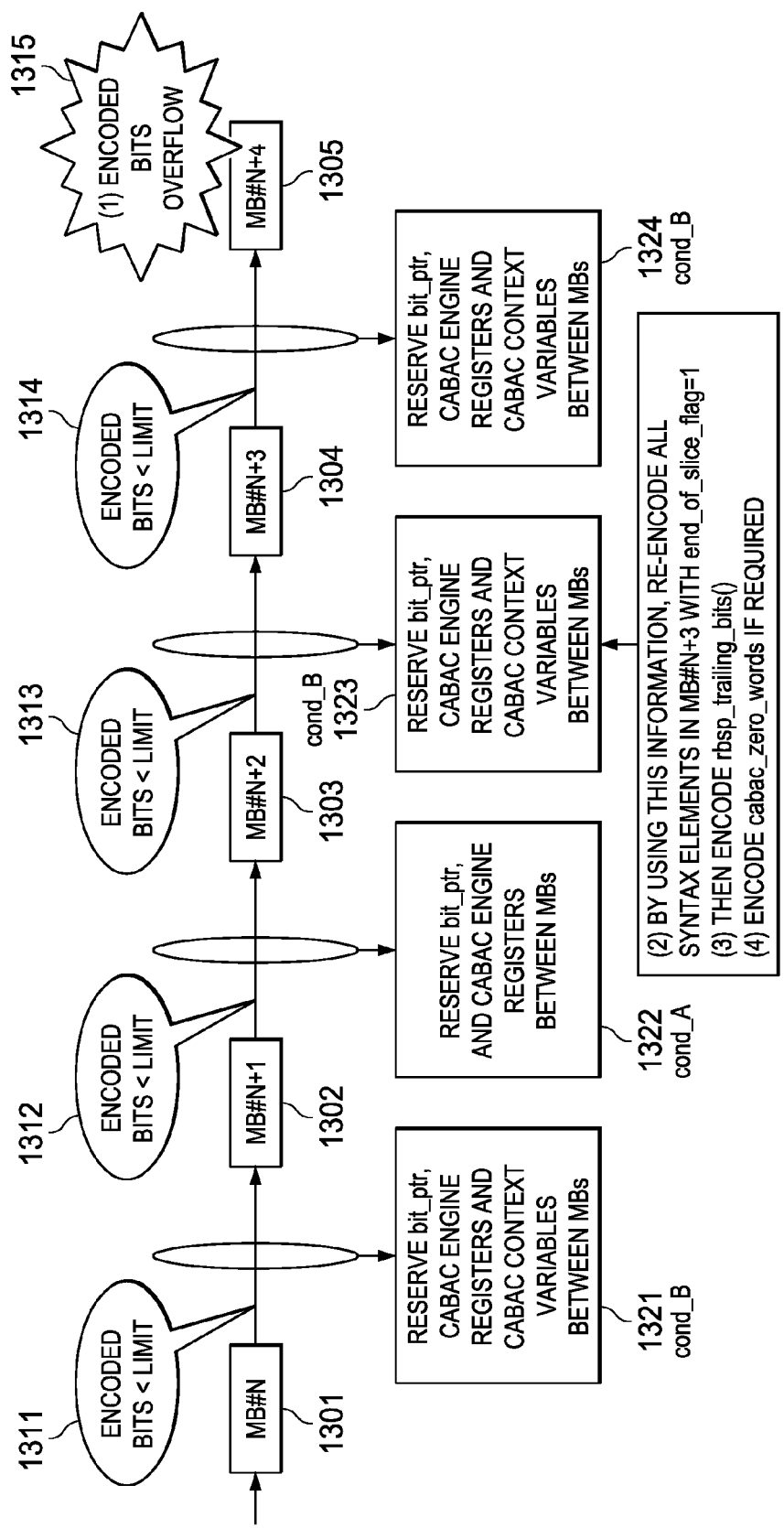
FIG. 13 illustrates an example a second embodiment of this invention.

FIG. 13 illustrates an example of the operation of this invention in the second case where the previous macroblock is cond_B and the macroblock before the previous macroblock is cond_B. FIG. 13 illustrates production of successive macroblocks 1301, 1302, 1303, 1304 and 1305. Following each macroblock a corresponding check block 1311, 1312, 1313, 1314 and 1315 checks to determine if adding the current macroblock plus the required end of slice bits exceeds the limit of slice size. Check blocks 1311, 1312, 1313, 1314 and 1315 also check the conditions listed above. Macro blocks 1301, 1303 and 1304 do not fulfill the codIRange and bitOutStanding conditions, and are marked as cond_B. The CABAC context variables are stored after their macroblock encodes. Macroblock 1202 fulfills the condition and is marked as cond_A.

Blocks 1321, 1322, 1323 and 1324 close the processing of a corresponding macroblock based upon whether that macroblock is marked cond_A or cond_B. Macroblocks 1301, 1303 and 1304 are marked cond_B. Thus blocks 1321, 1323 and 1324 end macroblock processing by reserving the bit pointer bit_ptr, the CABAC engine registers and CABAC context variables between macroblocks. Macroblocks 1302 is marked cond_A. Thus block 1322 ends macroblock processing by reserving the bit pointer bit_ptr, the CABAC engine registers between macroblocks.

In the example illustrated in FIG. 13 during or at the end of processing the macroblock 1305 the number of encoded bits exceeds the limit of slice size (1) as detected by check block 1315. This determination triggers the rewind. Since macroblock 1304 is marked as cond_B, the CABAC engine registers and bit pointer just before end_of_slice_flag cannot be recovered from the reserved data after macroblock 1304. The video encoder uses the reserved data recorded after macroblock 1303 rather than that recorded after macroblock 1304.

The video encoder recovers the bit pointer, CABAC engine registers and CABAC context variables to the values just after macroblock 1303 and encodes all syntax elements in macroblock layer for macroblock 1303 (2). The encoded value of end_of_slice_flag is set to 1 making this macroblock the last macroblock in the slice. The video encoder encodes rbsp_trailing_bits( ) (3). Finally the video encoder encodes cabac_zero_words if required (4).

In the example illustrated in FIG. 13, since macroblock 1304 is marked as cond_B and thus the CABAC engine registers and bit pointer just before the end_of_slice_flag are not recoverable, the video encoder needs to use the reserved data after macroblock 1302 and encode all syntax elements in macroblock 1303. This encoding will be cycle consuming taking the same cycle time as encoding one macroblock.

Figure 14:
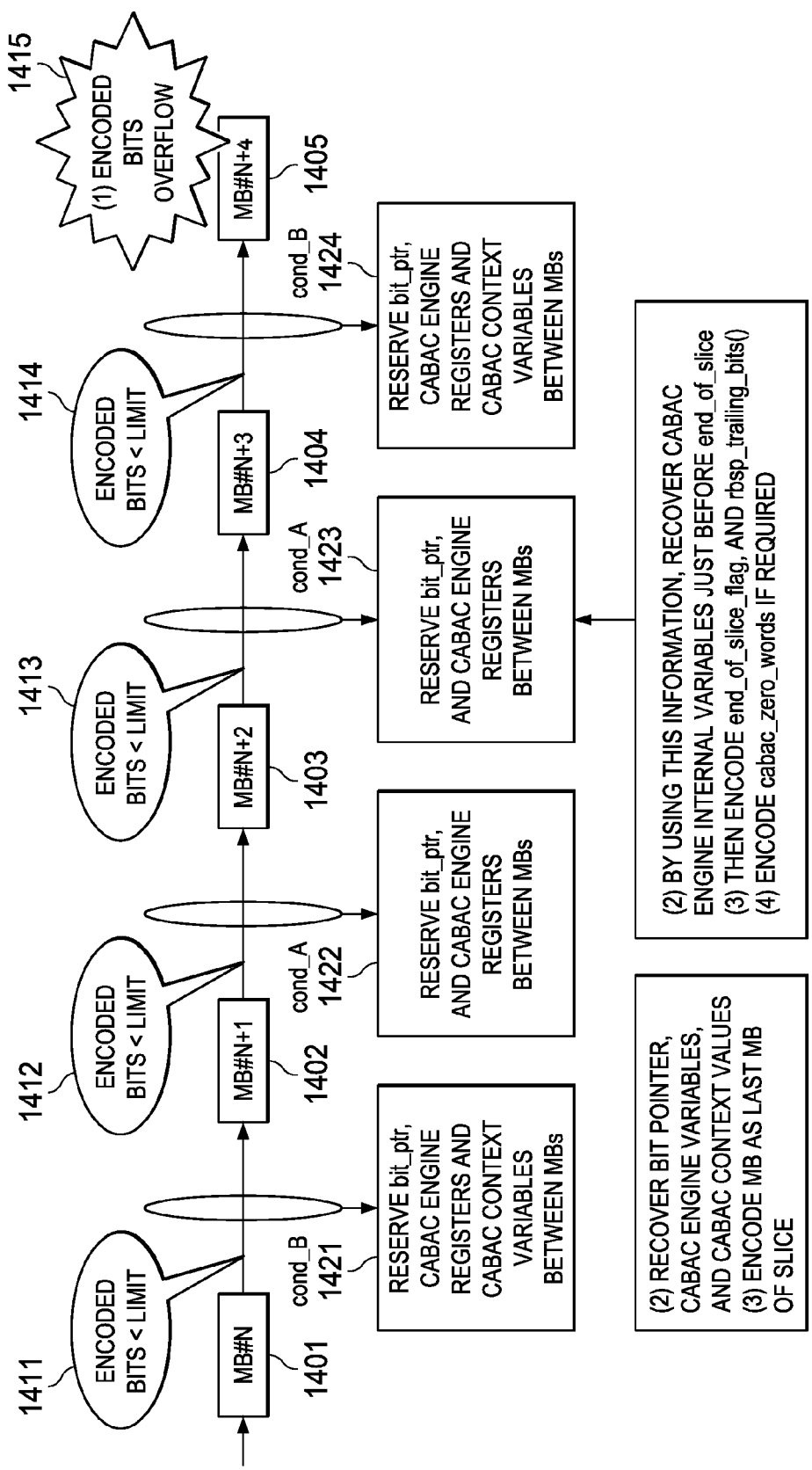
FIG. 14 illustrates an example a third embodiment of this invention.

FIG. 14 illustrates an example of the operation of this invention in the third case where the previous macroblock is cond_B and the macroblock before the previous macroblock is cond_A. Macroblocks 1401 and 1404 do not fulfill the codIRange and bitOutStanding conditions. They are marked as cond_B and CABAC context variables are stored after their macroblock encodes. Macroblock 1402 and 1403 fulfill the conditions and are marked as cond_A.

Blocks 1421, 1422, 1423 and 1424 close the processing of a corresponding macroblock based upon whether that macroblock is marked cond_A or cond_B. Macroblocks 1401, 1403 and 1404 are marked cond_B. Thus blocks 1421, 1423 and 1424 end macroblock processing by reserving the bit pointer bit_ptr, the CABAC engine registers and CABAC context variables between macroblocks. Macroblocks 1402 is marked cond_A. Thus block 1422 ends macroblock processing by reserving the bit pointer bit_ptr, the CABAC engine registers between macroblocks.

In the example illustrated in FIG. 14 during or at the end of processing the macroblock 1405 the number of encoded bits exceeds the limit of slice size (1) as detected by check block 1415. This determination triggers the rewind. Since macroblock 1404 is marked as cond_B, the CABAC engine registers and bit pointer just before end_of_slice_flag are not recoverable from the reserved data after macroblock 1404. The video encoder uses the reserved data recorded after macroblock 1403 rather than that recorded after macroblock 1404.

The video encoder recovers CABAC engine registers and bit pointer to the values just before end_of_slice_flag coding of macroblock 1404 using the values after macroblock 1403 and encoding end of slice equal to 1 (2). The video encoder encodes rbsp_trailing_bits( ) (3). Finally, the video encoder encodes cabac_zero_words if required (4).

In the example illustrated in FIG. 14, since macroblock 1404 is marked as cond_B and thus the CABAC engine registers and bit pointer just before end_of_slice_flag are not recoverable, video encoder needs to use the reserved data after macroblock 1403 and re-encode end_of_slice_flag in macroblock 1404. This causes the slice size to be one macroblock smaller.

Figure 15:
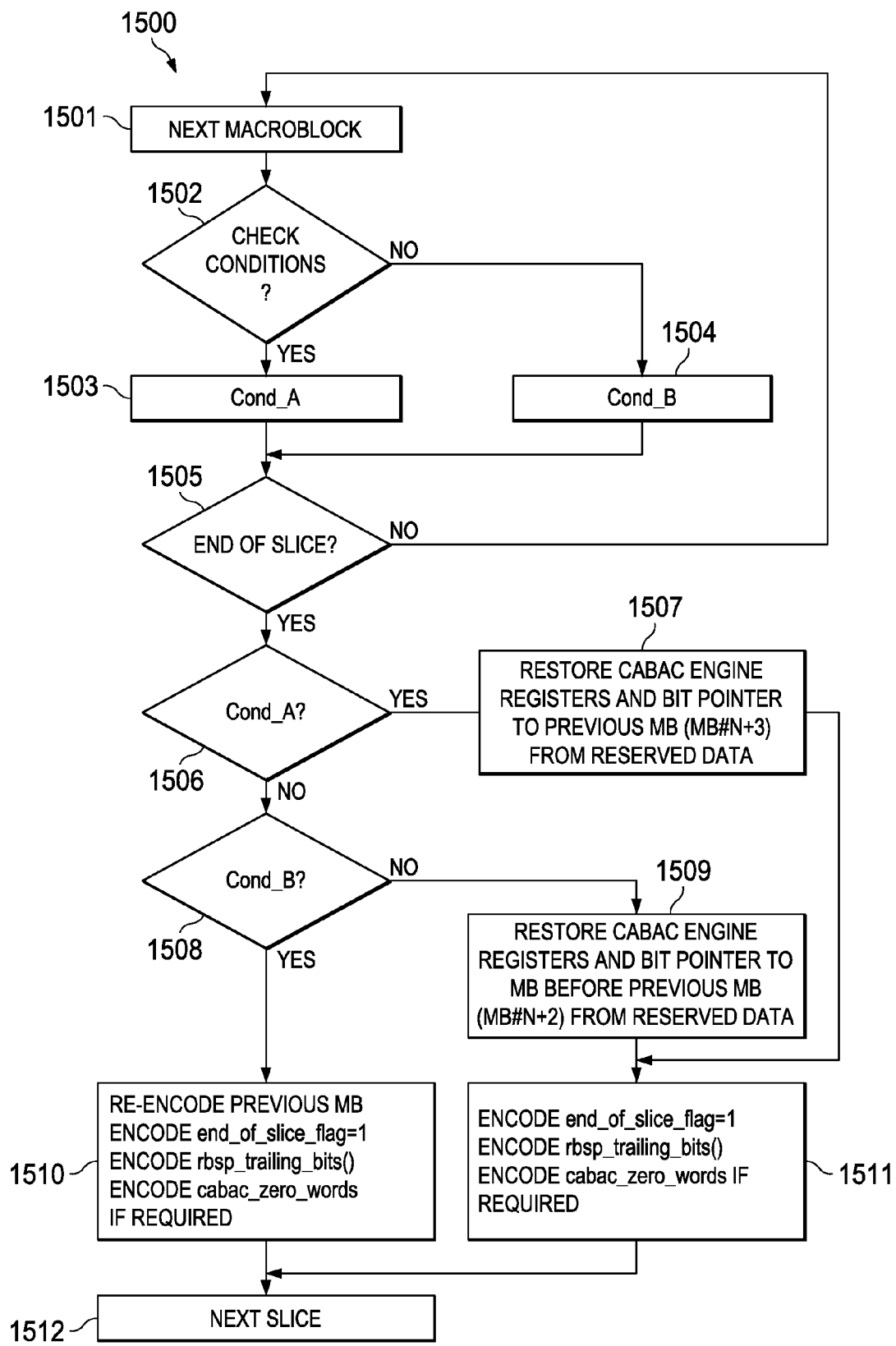
FIG. 15 illustrates a flow chart of the method of this invention.

FIGS. 12, 13 and 14 illustrate examples of 3 patterns of rewind and creation of end of slice. In all the cases the limit of slice size overflows at the fifth macroblock (1205, 1305, 1405). FIG. 15 is a flow chart summarizing the rewind and end of slice creation flow of this invention.

Flow chart 1500 begins with processing block 1501 which considers the next macroblock in the construction of slices. Decision block 1502 determines if the current macroblock satisfies the two conditions noted above:

((codIRange 0x1fc) &&
(codIRange 0x1fe||bitOutStanding≠0)).

If the current macroblock satisfies these conditions (Yes at decision block 1502), then processing block 1503 sets the condition of this macroblock to cond_A. If the current macroblock does not satisfy these conditions (No at decision block 1502), then processing block 1504 sets the condition of this macroblock to cond_B. Flow chart 1500 advances to decision block 1505 in either case.

Decision block 1505 determines if encoding the current macroblock would exceed the slice limit. This is determined by adding the number of bits needed to encode the current macroblock and any end of slice bits necessary such as end_of_slice_flag, tbsp_trailing_bits( ), cabac_zero_words and EPBs to a current amount of encoded bits. An end of slice condition is detected if this sum is greater than the slice limit.

If the current macroblock does not exceed the slice byte limit (No at decision block 1505), then flow chart 1500 returns to processing block 1501 to consider the next macroblock. If the current macroblock exceeds the slice byte limit (Yes at decision block 1505), then flow chart 1500 advances to decision block 1506.

Decision block 1506 determines whether the macroblock previous to the macroblock exceeding the slice limit has condition A. If this is the case (Yes at decision block 1506), then this corresponds to the situation illustrated in FIG. 12. Processing proceeds to processing block 1507 which restores the CABAC engine registers, bit pointer to the values of the previous macroblock which is macroblock 1204 based upon the bit pointer and CABAC engine registers reserved in block 1224. Flow chart 1500 then advances to processing block 1511 more fully described below.

If the macroblock previous to the macroblock exceeding the slice limit does not have condition A it thus has condition B. If this is the case (No at decision block 1506), then decision block 1508 determines whether the macroblock before the previous macroblock has condition B. If the condition of the macroblock before the previous macroblock is not condition B (the previous macroblock is condition A) (No at decision block 1508), then this corresponds to the situation illustrated in FIG. 14. Processing proceeds to block 1509 which restores the CABAC engine registers, bit pointer to the values of the macroblock before the previous macroblock which is macroblock 1403 based upon the bit pointer and CABAC engine registers reserved in block 1423. Flow chart 1500 then advances to processing block 1511.

Processing block 1511 completes processing for both the first case and for the third case. Processing block 1511 encodes all syntax elements for the restored macroblock data with end_of_slice_flag equal to 1. Processing block 1511 encodes rbsp_trailing_bits( ) to close the current slice and encodes cabac_zero_words if required. The last macroblock in the current slice is controlled by the path to block 1511. If the path to block 1511 was via block 1507, then the last macroblock is the previous macroblock, the macroblock before exceeding the slice limit. If the path to block 1511 was via block 1509, then the last macroblock is the macroblock before this previous macroblock. Processing block 1511 uses the fact that the bit pointer and CABAC engine registers are recoverable in this cases to reduce the computation load.

If the condition of the previous macroblock is cond_B (No at decision block 1506) and the condition of the macroblock before the previous macroblock is cond_B (Yes at decision block 1508), then this corresponds to the situation illustrated in FIG. 13. The bit pointer and CABAC engine registers are not recoverable. Processing proceeds to block 1510 which re-encodes the previous macroblock (macroblock 1304) with an end_of_slice_flag equal to 1. This re-encoding of the macroblock is a longer process than the restoration of blocks 1507 and 1509. Processing block 1510 encodes rbsp_trailing_bits( ) to close the current slice and encodes cabac_zero_words if required. In this case, the macroblock 1304 becomes the last macroblock in the current slice.

Table 3 shows a comparison of the attributes of the three cases noted above.

TABLE 3

| Previous macroblock condition | Macroblock before the previous macroblock condition | The last macroblock | Cycles for re-encode |
|---|---|---|---|
| cond_A | Don't care | N + 3 | Small (End of slice re-encode) |
| cond_B | cond_B | N + 3 | Large (All syntax elements in macroblock re-encode) |
| cond_B | cond_A | N + 2 | Small (End of slice re-encode) |

In the first case (previous macroblock cond_A) the video encoder rewinds to the end of the previous macroblock and makes it the last macroblock in the slice by re-encoding end_of_slice_flag. The number of required computer cycles for this re-encoding is small. In the second case (previous macroblock cond_B and macroblock before previous macroblock cond_B), the video encoder rewinds to the end of the macroblock before the previous macroblock and makes the previous macroblock the last macroblock in the slice by re-encoding all syntax elements for the macroblock. The number of computer cycles for this re-encoding is large. In the third case (previous macroblock cond_B and macroblock before previous macroblock cond_A), the video encoder rewinds to the end of the macroblock before the previous macroblock and makes that macroblock the last macroblock in slice by re-encoding end_of_slice_flag. The number of computer cycle for this re-encoding is small. For this third case the byte size of the slice is smaller than the other patterns.

The following calculates the theoretical probabilities of occurrence of cond_A macroblocks and cond_B macroblocks. The value of the variable codIRange is renormalized after finishing macroblock processing. The range of renormalized codIRange is from 0x100 to 0x1FF. If the probability of occurrence between 0x100 and 0x1FF is evenly distributed, the probability of cond_B macroblocks is less than 0.8% and the probability of cond_A macroblocks is more than 99.2%. Thus most macroblocks have cond_A. The method of this invention reduces the number of computer cycles needed to reserve CABAC context variables. Reserving CABAC context variables occurs only for cond_B macroblocks. Thus the probability for the first case is 99.2% and combined probability for the second and third cases is 0.8%.

The method of this invention includes several variants. Since probability of occurrence of cond_B macroblocks is very low, the method need not reserve any CABAC context variables even if the macroblock is cond_B macroblock. The variant rewinds the macroblocks to the nearest cond_A macroblock from the overflowed macroblock. This variant of the method does not cause any CABAC context variables transfer cycles.

The following demonstrates that CABAC engine registers just before end_of_slice_flag equal to 0 coding are recoverable. CABAC engine registers just before end_of_slice_flag equal to 0 coding are recoverable if CABAC the engine registers after macroblock coding fulfill both these conditions:

((codIRange 0x1fc) &&
(codIRange 0x1fe||bitOutStanding≠0)).

CABAC engine registers are recoverable if both the conditions are true because the CABAC engine codIRange before end_of_slice_flag coding is re-normalized. This means codIRange before the coding is in the range from 0x100 to 0x1FF. The CABAC coding method when the end_of_slice_flag equals 0 encodes a CABAC encode terminate with a value equal to 0. This process includes two steps. For the first step codIRange=codIRange−2. The second step is renormalization.

Figure 16:
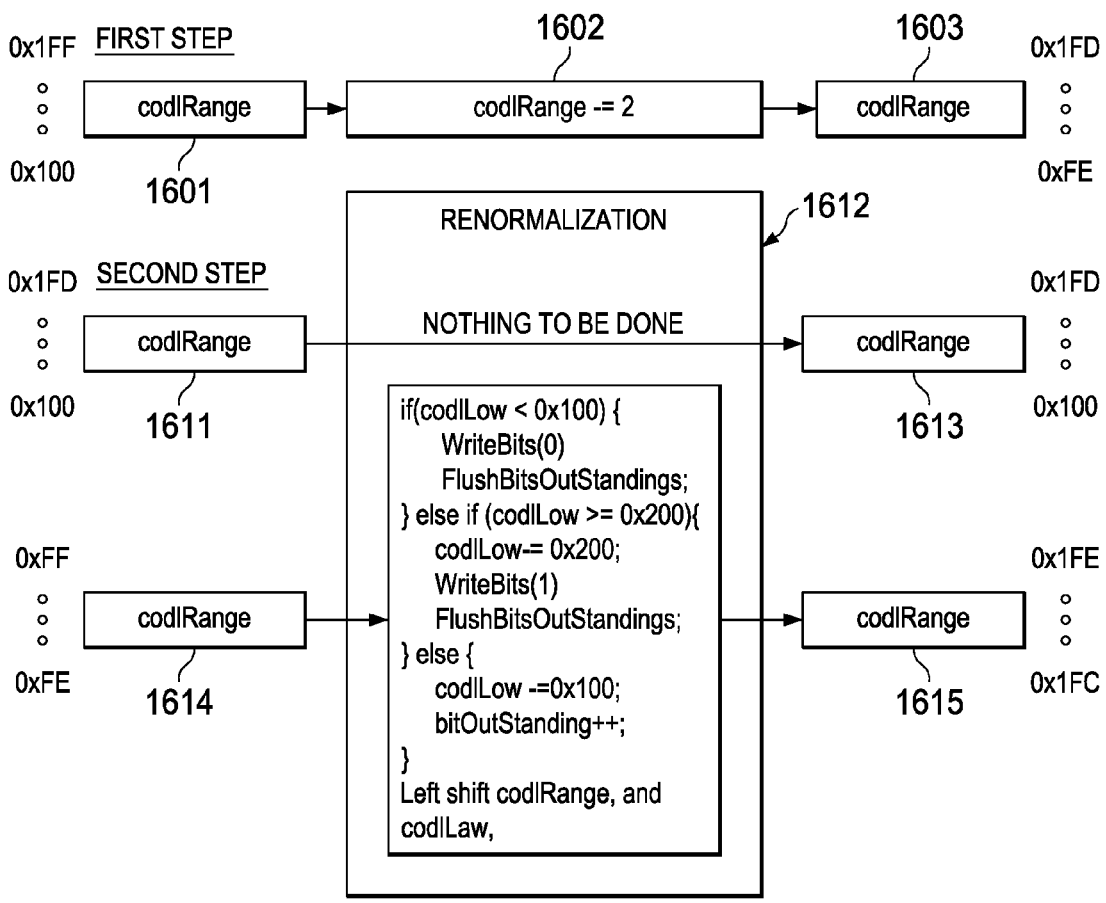
FIG. 16 illustrates an example of a context based adaptive binary arithmetic coding end of slice equal to 0 coding.

FIG. 16 illustrates how codIRange is changed by these first and second steps. The first step includes 1601, 1602 and 1603. Upon input to the first step codIRange is in the range from 0x100 to 0x1FF (1601). Step 1602 subtracts 2 from codIRange. Thus at 1603 the range of codIRange is changed to be from 0x0FE to 0x1FD. The second step is renormalization of codIRange. For codIRange in the range from 0x100 to 0x1FD (1611) codIRange does not need to be renormalized. In this case codIRange is already in the renormalized range. Thus step 1612 leaves codIRange unchanged and at 1613 the range of codIRange remains from 0x100 to 0x1FD. Only the codIRanges having the values between 0xFE and 0xFF are renormalized (1614). During renormalization, the following operations are executed (1612):

```
if (codIRange<0x100) {
    WriteBits(0)
    FlushBitsOutStanding;
} else if (codIRange≥0x200){
    codIRange = codIRange−0x200;
    WriteBits(1)
    FlushBitsOutStanding;
} else {
    codILow = codILow−0x100;
    bitOutStanding++
}
Left shift codIRange and codILow;
```

This typically includes: Write 0 bit to bitstream; Write all bitOutStandings to bitstream and bitOutStanding value becomes 0; and Left shift codIRange and codILow. After the operations, a codIRange of 0xFF is changed to 0x1FE and a codIRange of 0xFE is changed to 0x1FC.

If codIRange=0x1FC after end_of_slice_flag equal to 0 coding, whether the codIRange before the end_of_slice_flag coding is between 0x1FE and 0x100 cannot be known. This means if codIRange equals 0x1FC, the CABAC engine registers are not recoverable.

If codIRange=0x1FE after end_of_slice_flag equal to 0 coding, the codIRange before the end_of_slice_flag coding is known to be 0x101. If bitOutStanding after the coding is 0, whether the bitOutStanding flushing has happened during this renormalization or during the past renormalization cannot be known. If bitOutStanding is not 0, we know the codILow before the coding is in the range from 0x100 to 0x1FF and renormalization process increments bitOutStanding. This means if codIRange equal to 0x1FE and bitOutStanding is 0, CABAC engine registers are not recoverable. Except in these two cases, the CABAC engine registers are recoverable.

The following lists pseudo-code of the whole slice data encoding flow.

```
// Enum definition
enum {
    cond_A,         // MB fulfils the codIRange condition
    cond_B,         // MB does not fulfils the codIRange
                    condition
    UNDEF           // Undefined
} condition_e;
// Declare and initialize status variables at the beginning
// of slice condition_e post_condition = UNDEF;
// previous previous MB condition condition_e pre_condition
 = UNDEF;
// previous MB condition
// MB loop
while(1) {
    Encode MB;          // MB encode
    // Compare total encoded bits and the limit of slice
        size if (total encoded bits in slice plus the bits
        to be encoded at the end of slice exceeds the
        limit of slice size) {
    break;
    } else {
    // After MB process for non-overflowed MBs int
        codIRange, bitOutStanding, codILow; // CABAC
        engine values
    Read CABAC engine registers and set them into
        codIRange, bitOutStanding, codILow;
    if ((codIRange ≠ 0x1fc) &&
        (codIRange ≠ 0x1fe) || (bitOutStanding ≠ 0)) {
    // cond_A (condition A)
    buffer1 = buffer0;
    Reserve only CABAC engine registers and bit pointer to
        buffer0;
    buffer0 = buffer1;
    // Condition update
    post_condition = pre_condition;
    pre_condition = cond_A;
    } else {
    // cond_B (condition B)
    buffer1 = buffer0;
    Reserve CABAC engine registers, bit pointer and context
        variables to buffer0;
    buffer0 = buffer1;
    // Condition update
    post_condition = pre_condition;
    pre_condition = cond_B;
    }
}
// Rewind and create end of slice process
    The following is pseudo-code of the rewind and end of
slice creation process.
// Input: post_condition, pre_condition, buffer0 and buffer1
if (pre_condition == cond_A) {
    // Recover CABAC engine registers
    int codIRangeAfter, bitOutStandingAfter, codILowAfter,
        bit_ptr;
    int codIRangeBefore, bitOutStandingBefore,
        codILowBefore;
    Read buffer0 and set them into bit_ptr codIRangeAfter,
        bitOutStandingAfter and CodILowAfter variables;
    if ((codIRangeAfter == 0x1fe) && (bitOutStandingAfter ≠
        0)) {
    codIRangeBefore = 0x101;
    codILowBefore = (codILowAfter >> 1) + 0x100;
    bitOutStandingBefore = bitOutStandingAfter − 1;
    } else {
    codIRangeBefore = codIRangeAfter + 2;
    codILowBefore = codILowAfter;
    bitOutStandingBefore = bitOutStandingAfter;
    }
    // Re-encode end_of_slice_flag
    Set bit_ptr to bit pointer;
    Set codIRangeBefore, bitOutStandingBefore,
        codILowBefore variables to CABAC engine registers;
    CABAC Encode Terminate(1);
    // encode end_of_slice_flag == 1
} else if (post_condition == cond_A) {
    // pre condition == cond_B && post_condition == cond_A
    // Recover CABAC engine registers after the previous
    previous MB int codIRangeAfter, bitOutStandingAfter,
        codILowAfter, bit_ptr; int codIRangeBefore,
```

-continued

```
        bitOutStandingBefore, codILowBefore;
        Read buffer1 and set them into bit_ptr codIRangeAfter,
            bitOutStandingAfter and CodILowAfter variables;
        if ((codIRangeAfter == 0x1fe) && (bitOutStandingAfter ≠
            0)) {
            codIRangeBefore = 0x101;
            codILowBefore = (codILowAfter >> 1) + 0x100;
            bitOutStandingBefore = bitOutStandingAfter - 1;
        } else {
                codIRangeBefore = codIRangeAfter + 2;
                codILowBefore = codILowAfter;
                bitOutStandingBefore = bitOutStandingAfter;
        }
        // Re-encode end_of_slice_flag
        Set bit_ptr to bit pointer;
        Set codIRangeBefore, bitOutStandingBefore,
            codILowBefore variables to CABAC engine registers;
        CABAC Encode Terminate(1);
        // encode end_of_slice_flag == 1
    } else {
        // pre_condition == cond_B && post_condition == cond_B
        // Re-encode whole MB with end_of_slice_flag == 1
        int codIRangeBefore, bitOutStandingBefore,
            codILowBefore, bit_ptr;
        int context[ ];
        Read buffer1 and set them into bit_ptr,
            codIRangeBefore, bitOutStandingBefore,
            CodILowBefore, context[ ] variables;
        Set bit_ptr to bit pointer;
        Set codIRangeBefore, bitOutStandingBefore,
            codILowBefore variables to CABAC engine registers;
        Set context[ ] to CABAC context variables;
        Encode previous previous MB with end_of_slice_flag ==
            1;
    }
    Encode rbsp_trailing_bits( );
    Insert emulation prevention bytes if required;
    Add cabac_zero_bytes if required;
```

What is claimed is:

1. A computer implemented method of encoding video data into a compressed form, comprising the steps of: encoding a next macroblock in a frame of the video data including storing Context based Adaptive Binary Arithmetic Coding (CABAC) data in CABAC engine registers for a current macroblock and a macroblock immediately previous to said current macroblock; classifying said current macroblock as a first type having recoverable CABAC engine registers or a second type having non-recoverable CABAC engine registers; determining whether adding said current macroblock to a current slice would exceed a slice data size limit; if adding said current macroblock to said current slice would not exceed said slice data size limit, repeating said encoding, determining and classifying steps for successive next macroblocks until adding said current macroblock to said current slice exceeds said slice data size limit; if adding said current macroblock to said current slice would exceed said slice data size limit if a macroblock immediately previous to said current macroblock is said first type, then restoring the CABAC engine registers for said immediately previous macroblock, setting a pointer to point to said immediately previous macroblock and ending said current slice following said immediately previous macroblock, if a macroblock immediately previous to said current macroblock is said second type, then if a macroblock immediately before said macroblock immediately previous to said current macroblock is said first type, then restoring the CABAC engine registers for said macroblock immediately before said immediately previous macroblock, setting a pointer to point to macroblock immediately before said immediately previous macroblock and ending said current slice following macroblock immediately before said immediately previous macroblock, and if a macroblock immediately before said macroblock immediately previous to said current macroblock is said second type, then restoring the CABAC engine registers for said macroblock immediately before said immediately previous macroblock by re-encoding said immediately previous macroblock, setting a pointer to point to said immediately previous macroblock and ending said current slice following said immediately previous macroblock.

2. The computer implemented method of claim 1, wherein:
said step of classifying said current macroblock includes
    determining whether the following conditions are met
        by said current macroblock
        $codIRange \neq 0x1fc$
        $codIRange \neq 0x1fe \| bitOutStanding \neq 0$,
    if said current macroblock meets both of said conditions
        classifying said current macroblock as a first type, and
    if said current macroblock does not meet either of said
        conditions classifying said current macroblock as a
        second type.

3. The computer implemented method of claim 1, wherein:
said step of determining whether adding said current macroblock to a current slice would exceed a slice data size limit includes adding a predetermined number of bits corresponding to end of slice coding; and
said steps of ending said current slice each include adding bits of end of slice coding.

4. The computer implemented method of claim 1, wherein:
said step of encoding a next macroblock includes
    storing Context based Adaptive Binary Arithmetic Coding (CABAC) data for said current macroblock in a first set of CABAC engine registers,
    storing Context based Adaptive Binary Arithmetic Coding (CABAC) data for said macroblock immediately previous to said current macroblock in a second set of CABAC engine registers, and
    overwriting one of said first or second set of CABAC engine registers for each current macroblock.

* * * * *